United States Patent
Yu et al.

(10) Patent No.: US 9,161,304 B2
(45) Date of Patent: Oct. 13, 2015

(54) POWER MANAGEMENT BASED ON DISCONTINUOUS RECEPTION CYCLES IN A MOBILE COMMUNICATION SYSTEM

(75) Inventors: Yu-Ping Yu, Hsinchu (TW); Kai-Ten Feng, Hsinchu (TW)

(73) Assignee: TRANSPACIFIC IP MANAGEMENT GROUP LTD., Taipei (TW)

( * ) Notice: Subject to any disclaimer, the term of this patent is extended or adjusted under 35 U.S.C. 154(b) by 701 days.

(21) Appl. No.: 13/447,864

(22) Filed: Apr. 16, 2012

(65) Prior Publication Data

US 2013/0155928 A1 Jun. 20, 2013

Related U.S. Application Data

(60) Provisional application No. 61/570,678, filed on Dec. 14, 2011.

(51) Int. Cl.
   *G08C 17/00* (2006.01)
   *H04W 52/02* (2009.01)

(52) U.S. Cl.
   CPC .................. *H04W 52/0216* (2013.01)

(58) Field of Classification Search
   CPC .................................... H04W 52/02
   USPC .......................... 370/311, 312, 313
   See application file for complete search history.

(56) References Cited

U.S. PATENT DOCUMENTS

| | | | |
|---|---|---|---|
| 2009/0285141 A1* | 11/2009 | Cai et al. | 370/311 |
| 2011/0199910 A1* | 8/2011 | Oh et al. | 370/241 |
| 2011/0268003 A1* | 11/2011 | Li et al. | 370/311 |
| 2012/0195212 A1* | 8/2012 | Zhang et al. | 370/252 |
| 2012/0257557 A1* | 10/2012 | Yamazaki et al. | 370/311 |
| 2014/0211673 A1* | 7/2014 | Lu et al. | 370/311 |

OTHER PUBLICATIONS

Yang et al., "Modeling UMTS Discontinuous Reception Mechanism," IEEE Trans. Wireless Communications, vol. 4, No. 1, pp. 312-319, Jan. 2005.
Yang et al., "Modeling UMTS Power Saving with Bursty Packet Data Traffic," IEEE Trans. Mobile Computing, vol. 6, No. 12, pp. 1398-1409, Dec. 2007.
Zhou et al., "Performance Analysis of Power Saving Mechanism with Adjustable DRX Cycles in 3GPP LTE," Proc. IEEE VTC—fall, pp. 1-5, Sep. 2008.
Polignano et al., "Power Savings and QoS Impact for VoIP Application with DRX/DTX Feature in LTE," Proc. IEEE VTC—spring, pp. 1-5, May 2011.
Huang Bo et al., "DRX-Aware Scheduling Method for Delay-Sensitive Traffic," IEEE Communications Letters, vol. 14, No. 12, pp. 1113-1115, Dec. 2010.

(Continued)

*Primary Examiner* — Anh-Vu Ly
*Assistant Examiner* — Abdelnabi Musa
(74) *Attorney, Agent, or Firm* — Amin, Turocy & Watson, LLP

(57) ABSTRACT

A device in a base station of a mobile communication system for power management can include a storage device to store a group of parameter sets associated with a user equipment (UE) of the mobile communication system. The device can include a processor to calculate a corresponding objective function associated with each entity of the group of parameter sets. The processor can be configured to select an entity of the group of parameter sets based on the corresponding objective function, and the selected entity of the group of parameter sets facilitates the power management for the UE.

26 Claims, 20 Drawing Sheets

(56) References Cited

OTHER PUBLICATIONS

IEEE Standard for Local and Metropolitan Area Networks, Part 16: Air Interference for Fixed Broadband Wireless Access Systems, Amendment 2: Physical and Medium Access Control Layers for Combined Fixed and Mobile Operation in Licensed Bands and Corrigendum 1, IEEE Standard 802.16e-2005, Feb. 2006.

Kim et al., "Adaptive Power Saving Mechanism Considering the Request Period of Each Initiation of Awakening in the IEEE 802.16e System," IEEE Communications Letters, vol. 12, No. 2, pp. 106-108, Feb. 2008.

Kong et al., "Performance Study and System Optimization on Sleep Mode Operation in IEEE 802.16e," IEEE Trans. Wireless Communications, vol. 8, No. 9, pp. 4518-4528, Sep. 2009.

Hsu et al, "Statistical Control Approach for Sleep Mode Operations in IEEE 802.16m Systems," IEEE Trans. Vehicular Technology, vol. 59, No. 9, pp. 4453-4466, Nov. 2010.

Yoshihara et al., "Practical Time-scale Fitting of Self-similar Traffic with Markov-modulated Poisson Process," Telecommunication Systems, vol. 17, No. 1-2, pp. 185-211, 2001.

Anthony Cassandra, "Exact and Approximate Algorithms for Partially Observable Markov Decision Processes," Ph.D. dissertation, Brown Univ., Providence, RI, May 1998.

\* cited by examiner

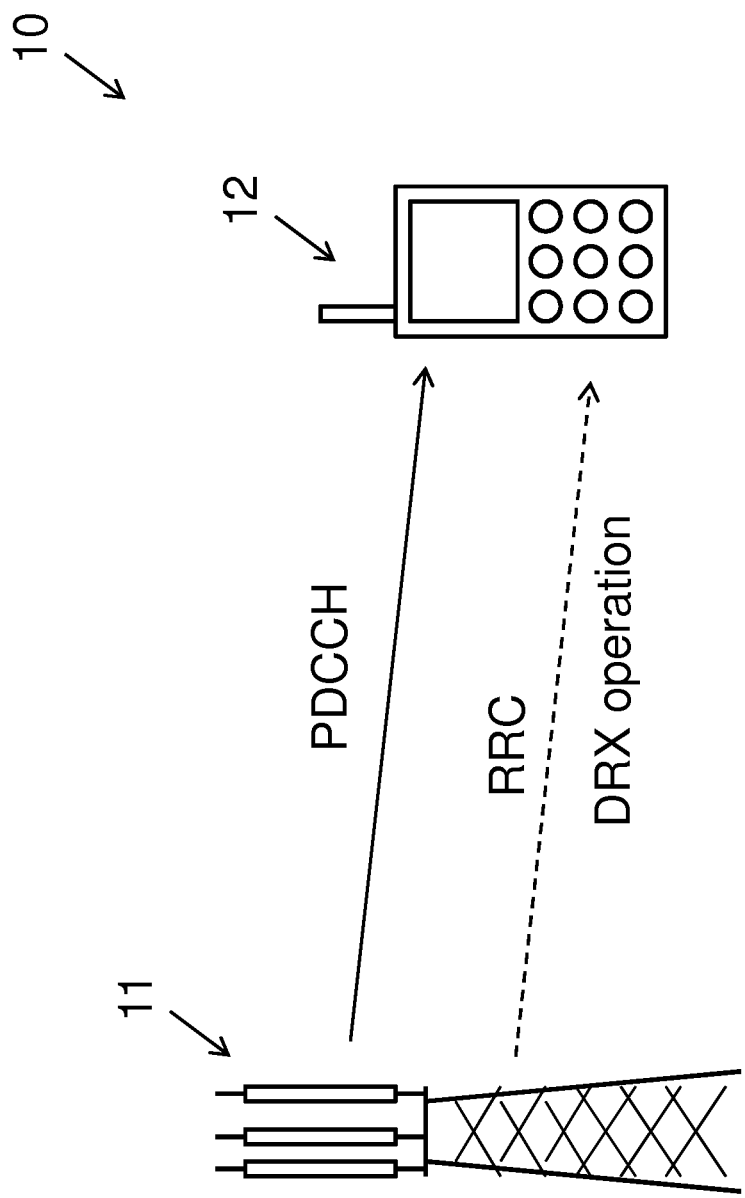

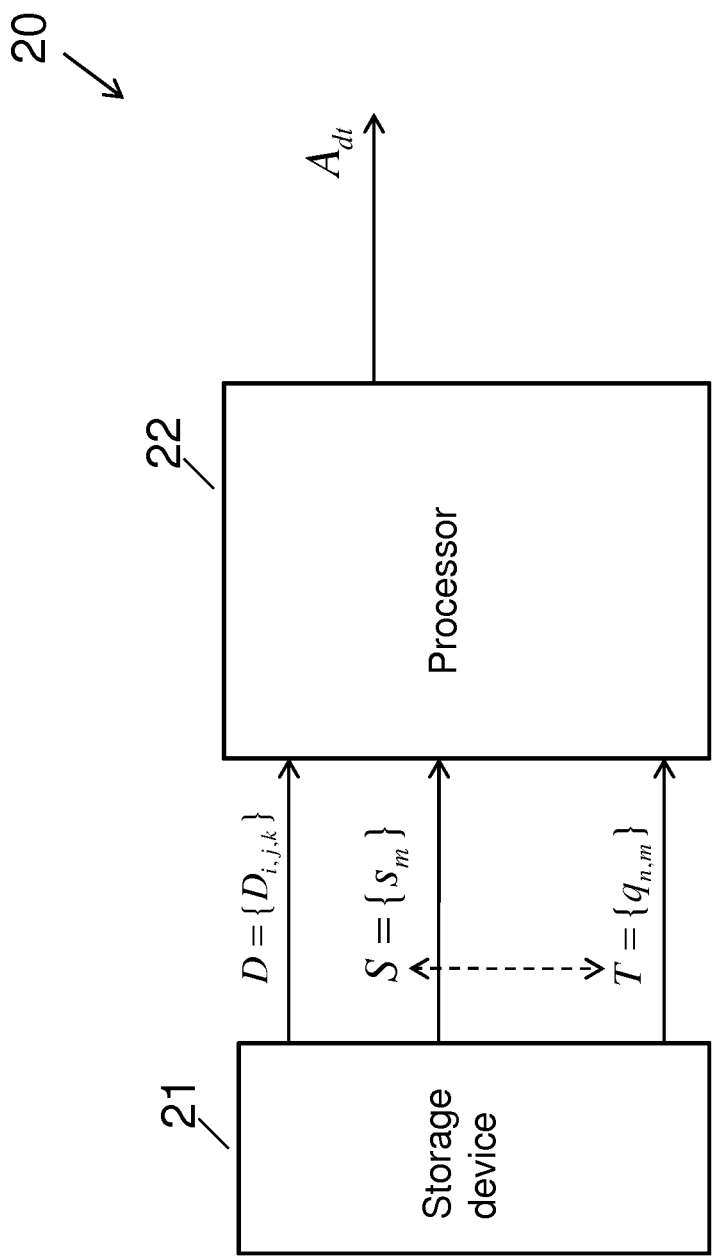

Input: $S$, $A_{DL}$, $A_{SC}$, $A_{DS}$, constraint $\delta_D$
Output: reward function $\mathcal{R}$
foreach $s_m \in S$ do
  foreach $a_{DS,i} \in A_{DS}$ do
    foreach $a_{SC,j} \in A_{SC}$ do
      foreach $a_{DL,k} \in A_{DL}$ do
        if $\overline{D}(\lambda_{s_m}, D_{i,j,k}) \leq \delta_D$ then
          $r(s_m, A_{i,j,k}) \leftarrow \overline{SR}(\lambda_{s_m}, D_{i,j,k})$
        else
          $r(s_m, A_{i,j,k}) \leftarrow \overline{SR}_{min}$
        end
      end
    end
  end
end

FIG. 5B

POWER MANAGEMENT BASED ON DISCONTINUOUS RECEPTION CYCLES IN A MOBILE COMMUNICATION SYSTEM

RELATED APPLICATION(S)

This patent application claims priority to U.S. Provisional Patent Appln. No. 61/570,678, filed Dec. 14, 2011, and entitled "TRAFFIC-BASED DRX CYCLES ADJUSTMENT SCHEME FOR 3GPP LTE SYSTEMS", the entirety of which is incorporated herein by reference.

BACKGROUND

The present disclosure relates generally to mobile communication; for example, the present disclosure relates to a device and a method for power management in a mobile communication system.

A mobile communication system that supports the third generation partnership project (3GPP) long term evolution (LTE) standard has been developed so as to enhance data rate and reduce transmission latency. However, a higher data rate may entail higher power consumption for user equipment (UE). To address the issue, power saving mechanisms have been proposed, but which are not adequate in various respects.

BRIEF SUMMARY

A simplified summary is provided herein to help enable a basic or general understanding of various aspects of non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Example embodiments may provide a device in a base station of a mobile communication system for power management, the device comprising a storage device to store a group of parameter sets associated with a user equipment (UE) of the mobile communication system, and a processor to calculate evaluation metrics associated with each entity of the group of parameter sets, wherein the processor is configured to select an entity of the group of parameter sets based on the evaluation metrics, the selected entity of the group of parameter sets facilitates the power management for the UE.

Some example embodiments may provide a method for power management in a mobile communication system, the method comprising providing a group of parameter sets, providing a group of candidate action sets associated with the group of parameter sets, providing a set of discrete traffic states associated with a traffic between a base station and a user equipment (UE) of the mobile communication system, calculating corresponding objective function associated with each entity of the group of candidate action sets, the objective function is associated with the set of discrete traffic states, selecting an appropriate action set from the group of candidate action sets based on the objective function, and taking an appropriate action corresponding to the selected action set at a decision point, the taken action facilitates the power management for the UE.

It is to be understood that both the foregoing general description and the following detailed description are exemplary and explanatory only and are not restrictive. Therefore, the disclosed subject matter should not be limited to any single embodiment, or group of embodiments described herein, but rather should be construed in breadth and scope in accordance with the appended claims.

BRIEF DESCRIPTION OF THE DRAWINGS

The foregoing summary, as well as the following detailed description of the various embodiments, will be better understood when read in conjunction with the appended drawings. For the purpose of illustrating the various embodiments, there are shown in the drawings various examples. It should be understood, however, that the various embodiments are not limited to the precise arrangements and instrumentalities shown and that other similar embodiments can be used or modifications and additions can be made to the described embodiments for performing the same, similar, alternative, or substitute function of the disclosed subject matter without deviating therefrom.

Numerous aspects, embodiments, objects and advantages of the present invention will be apparent upon consideration of the following detailed description, taken in conjunction with the accompanying drawings, in which like reference characters refer to like parts throughout, and in which:

FIG. 1A is a block diagram of a mobile communication system that supports a third generation partnership project (3GPP) long term evolution (LTE) standard;

FIG. 3A is a block diagram of the device for performing the TDCA scheme in accordance with an example embodiment;

FIG. 5B illustrates a reward assignment algorithm in accordance with an example embodiment;

DETAILED DESCRIPTION

Reference will now be made in detail to the present examples of the various embodiments, examples of which are illustrated in the accompanying drawings. Wherever possible, the same reference numbers will be used throughout the drawings to refer to the same or like parts.

Figure 1B:
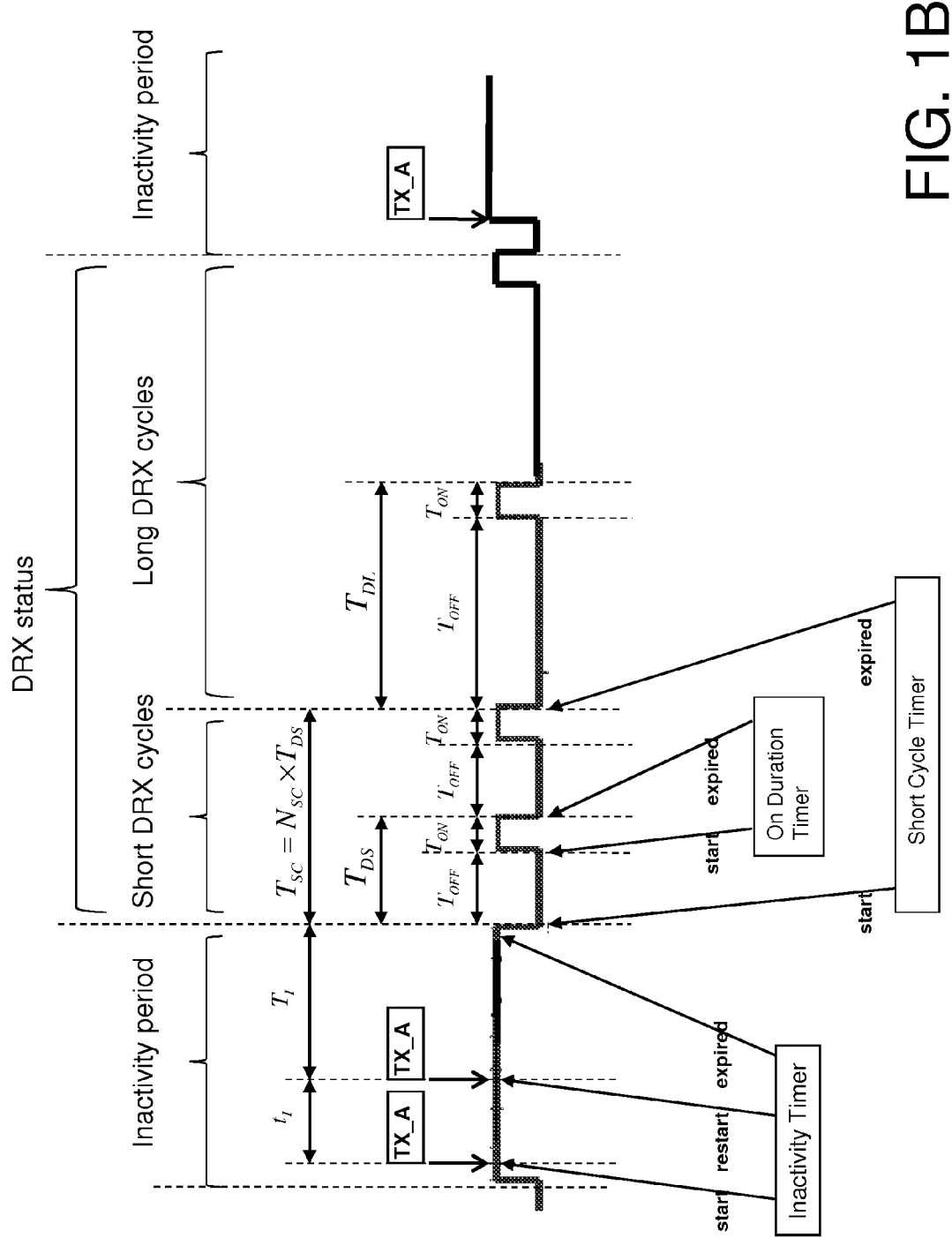
FIG. 1B illustrates the DRX operation for the 3GPP LTE mobile communication system illustrated in FIG. 1A.

FIG. 1A is a block diagram of a mobile communication system 10 that supports the 3GPP LTE standard. Referring to FIG. 1A, the mobile communication system 10 may include a base station 11 (e.g., an evolved NodeB (eNB)) and UE 12. In operation, the UE 12 may listen to (e.g., monitor) a physical downlink control channel (PDCCH) between the base station 11 and the UE 12 to determine whether the resource is allocated in either a downlink direction or an uplink direction. However, to reduce power consumption for the UE 12, the UE 12 may stop monitoring the PDCCH if not necessary. That is, the UE 12 may discontinuously monitor the PDCCH, which may be achieved by performing a discontinuous reception (DRX) operation. The DRX operation may be activated by the base station 11 through a radio resource control (RRC), as will be discussed in the following paragraphs by reference to FIG. 1B.

FIG. 1B illustrates the DRX operation for the 3GPP LTE mobile communication system 10 illustrated in FIG. 1A. Referring to FIG. 1B, the DRX operation may be controlled by several timers. Such timers may include, for example, an "Inactivity timer", an "On Duration Timer" and a "Short Cycle Timer". Specifically, in an Inactivity period, transmission assignments (denoted as "TX_A") may appear on the PDCCH. The Inactivity timer may start when a first transmission assignment appears on the PDCCH and may restart when subsequent transmission assignments appear. If no transmission assignments appear on the PDCCH for a time period which exceeds a threshold denoted as "$T_1$", the Inactivity timer may expire, and the UE 12 may enter a DRX status in which the UE 12 may discontinuously monitor the PDCCH.

In a first stage of the DRX status, the UE 12 may experience short DRX cycles. Specifically, the UE 12 may turn on its receiving circuit to monitor the PDCCH for a time period denoted as "$T_{ON}$". The On Duration Timer may start when the UE 12 begins to monitor the PDCCH and expire if the time period for which the UE 12 monitors the PDCCH exceeds the time period $T_{ON}$. If the On Duration Timer expires, the UE 12 may stop monitoring the PDCCH and may turn off its receiving circuit so as to reduce power consumption. The time period for which the UE 12 stops monitoring the PDCCH may be denoted as "$T_{OFF}$". The summation of the time periods $T_{ON}$ and $T_{OFF}$ may be denoted as "$T_{DS}$" and may indicate a cycle length for the short DRX cycle. The UE 12 may experience a plurality of such short DRX cycles.

When the UE 12 experiences a first short DRX cycle, the Short Cycle Timer may start. On the other hand, if the time period for which no transmission assignments appear on the PDCCH exceeds a threshold denoted as "$T_{SC}$", the Short Cycle Timer may expire. Once the Short Cycle Timer expires, the UE 12 may enter a second stage of the DRX status. More particularly, the threshold $T_{SC}$ may be a multiple of the cycle length $T_{DS}$ of the short DRX cycle. The threshold $T_{SC}$ may thus be expressed in the following equation:

$$T_{SC} = N_{SC} \times T_{DS} \qquad \text{eq. (1)}$$

In other words, the Short Cycle Timer may expire if no transmission assignments appear on the PDCCH for $N_{SC}$ short DRX cycles. At the time point that the Short Cycle Timer expires, which indicates the beginning of the second stage of the DRX status, the DRX cycles may be extended to long DRX cycles with cycle length of "$T_{DL}$". The UE 12 may experience a plurality of such long DRX cycles, until a further transmission assignment appears on the PDCCH. Once the further transmission assignment appears on the PDCCH, the UE 12 may leave the DRX status and re-enter the Inactivity period.

Parameters of the DRX cycles, such as the cycle length $T_{DS}$ of the short DRX cycles, the cycle length $T_{DL}$ of the long DRX cycles and the maximum number $N_{SC}$ of the short DRX cycles, may dominate the performance (e.g., power saving efficiency) of the DRX operation. For example, longer cycle lengths $T_{DS}$ and $T_{DL}$ with fixed On Duration period $T_{ON}$ may lead to longer time periods (e.g., $T_{OFF}$) for which the UE 12 turns off its receiving circuit, and the power saving efficiency may thus be enhanced. However, longer cycle lengths $T_{DS}$ and $T_{DL}$ may cause larger packet delay that may degrade the data transmission efficiency between the base station 11 and the UE 12 and in turn the quality of service (QoS). Accordingly, feasible setting of the parameters $T_{DS}$, $T_{DL}$ and $N_{SC}$ is used to balance the power saving efficiency and the QoS.

Furthermore, current traffic status between the base station 11 and the UE 12 may also influence the performance of the DRX operation. Accordingly, appropriate adjustment of the parameters $T_{DS}$, $T_{DL}$ and $N_{SC}$, for which current traffic status is considered to achieve optimal performance of the DRX operation. Such a DRX parameter adjustment scheme in which current traffic status is taken into account may be named a traffic-based DRX cycles adjustment (TDCA) scheme.

Figure 2:
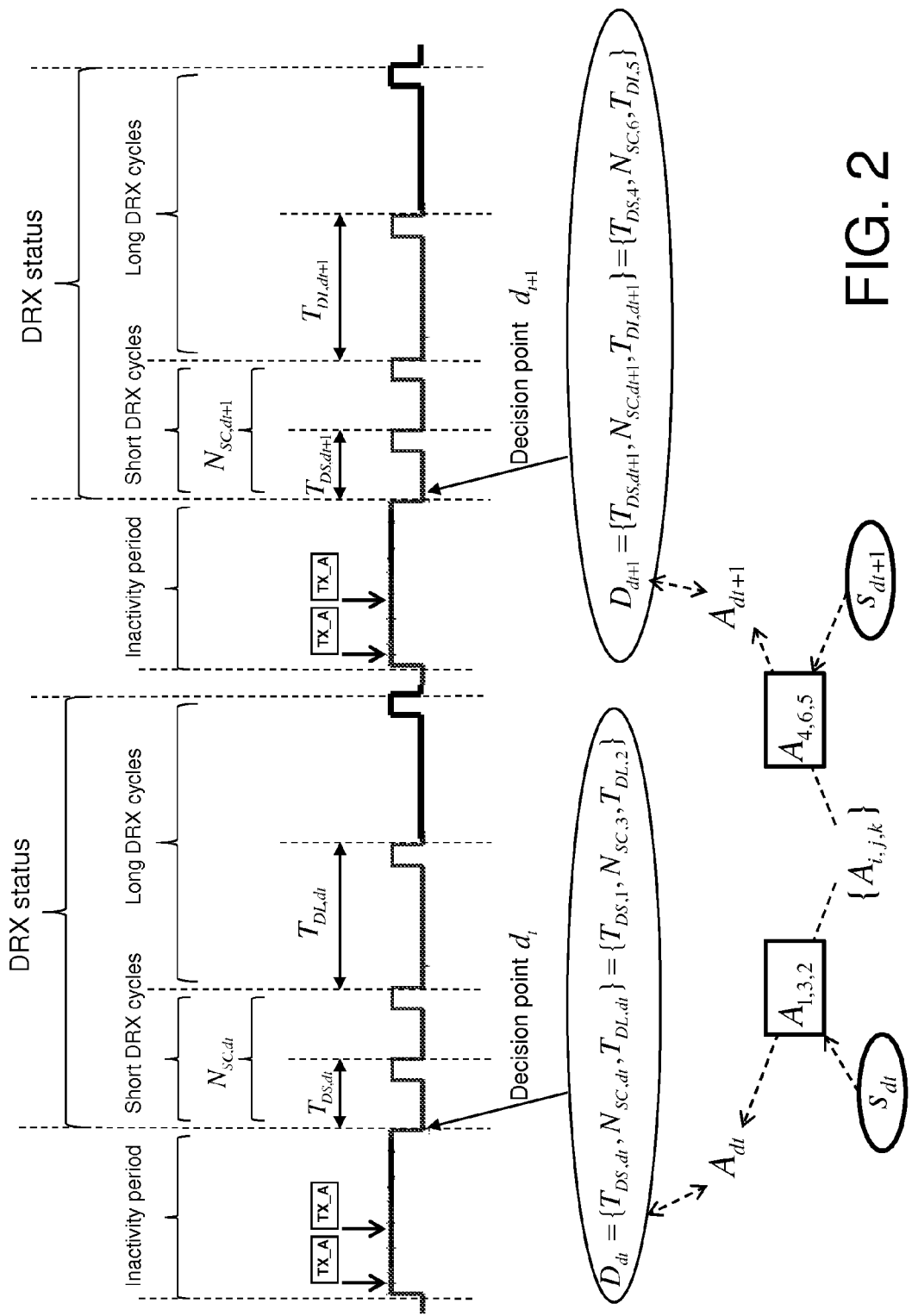
FIG. 2 illustrates the traffic-based DRX cycles adjustment (TDCA) scheme for the 3GPP LTE mobile communication system illustrated in FIG. 1A.

FIG. 2 illustrates a TDCA scheme for the 3GPP LTE mobile communication system 10 illustrated in FIG. 1A. Referring to FIG. 2, a decision point $d_t$ may be defined as a time point at which the user equipment (UE) 12 may enter a discontinuous reception (DRX) status. At the decision point $d_t$, DRX parameters $T_{DS,dt}$, $T_{DL,dt}$ and $N_{SC,dt}$ for the undergoing DRX cycles of the DRX operation may be decided (e.g., may be set as specific values) by the base station 11 through the radio resource control (RRC). The DRX parameters $T_{DS,dt}$, $T_{DL,dt}$ and $N_{SC,dt}$ may form a DRX parameter set $D_{dt}$ as given in the following equation:

$$D_{dt} = \{T_{DS,dt}, N_{SC,dt}, T_{DL,dt}\} \qquad \text{eq. (2)}$$

Furthermore, an action set $A_{dt}$ which may correspond to the DRX parameter set $D_{dt}$ may indicate actions by which the DRX parameters $T_{DS,dt}$, $T_{DL,dt}$ and $N_{SC,dt}$ are decided at the decision point $d_t$. The action set $A_{dt}$ may thus be defined in the following equation:

$$A_{dt} = \{a_{DS,dt}, a_{SC,dt}, a_{DL,dt}\} \qquad \text{eq. (3)}$$

where $a_{DS,dt}$ may indicate an action by which $T_{DS,dt}$ may be decided. Likewise, $a_{DL,dt}$ may indicate an action by which $T_{DL,dt}$ may be decided, and $a_{SC,dt}$ may indicate an action by which $N_{SC,dt}$ may be decided.

In the TDCA scheme of an embodiment, the DRX parameters $T_{DS}$, $T_{DL}$ and $N_{SC}$ may be adaptively adjusted. That is, at the decision point $d_t$, the action set $A_{dt}$ may be taken to set the DRX parameter set $D_{dt}$ for the undergoing DRX cycles. On the other hand, for a next decision point $d_{t+1}$ at which the UE 12 may enter a subsequent DRX status, another action set $A_{dt+1}$ may be taken to set another DRX parameter set $D_{dt+1}$ for the subsequent DRX cycles. Thereby, DRX parameters $T_{DS}$, $T_{DL}$ and $N_{SC}$ may be adaptively adjusted at each decision point, given that status of the mobile communication system 10 at each decision point is considered. Such status of the mobile communication system 10 may include traffic status (denoted as "$S_{dt}$") of data transmission between the base station 11 and the UE 12 at the decision point $d_t$. From the above, the TDCA scheme of the present embodiment may be performed further considering the traffic status $S_{dt}$.

More particularly, in the TDCA scheme, a finite number of candidates may be provided for the DRX parameters $T_{DS}$, $T_{DL}$ and $N_{SC}$ at each decision point. The finite number of candidates may be denoted as a group of DRX parameter sets $\{D_{i,j,k}\}$, and the group of DRX parameter sets $\{D_{i,j,k}\}$ may be expressed in the following equation:

$$\{D_{i,j,k}\} = \{T_{DS,i}, N_{SC,j}, T_{DL,k}\} \qquad \text{eq. (4)}$$

where $T_{DS,i}$ may indicate the i-th candidate within the set of candidates $\{T_{DS,i}\}$ for the DRX parameter $T_{DS}$. Likewise, $T_{DL,k}$ may indicate the k-th candidate within the set of candidates $\{T_{DL,k}\}$ for the DRX parameter $T_{DL}$, and $N_{SC,j}$ may indicate the j-th candidate within the set of candidates $\{N_{SC,j}\}$ for the DRX parameter $N_{SC}$.

In addition, a group of action sets $\{A_{i,j,k}\}$ may correspond to the group of DRX parameter sets $\{D_{i,j,k}\}$ and may be expressed in the following equation:

$$\{=A_{i,j,k}\} = \{a_{DS,i}, a_{SC,j}, a_{DL,k}\} \qquad \text{eq. (5)}$$

where $a_{DS,i}$ may indicate an action by which the i-th candidate $T_{DS,i}$ is selected to be the cycle length $T_{DS}$ for the short DRX cycles. Likewise, $a_{DL,k}$ may indicate an action by which the k-th candidate $T_{DL,k}$ is selected to be the cycle length $T_{DL}$ for the long DRX cycles, and $a_{SC,j}$ may indicate an action by which the j-th candidate $N_{SC,j}$ is selected to be the maximum number of short DRX cycles $N_{SC}$.

In one example, the set of candidates $\{T_{DS,i}\}$ may have four entities denoted as $\{T_{DS,1}, T_{DS,2}, T_{DS,3}, T_{DS,4}\} = \{50, 100, 150, 200\}$ subframes. Furthermore, the set of candidates $\{N_{SC,j}\}$ may have six entities denoted as $\{N_{SC,1}, N_{SC,2}, N_{SC,3}, N_{SC,4}, N_{SC,5}, N_{SC,6}\} = \{1, 2, 3, 4, 5, 6\}$ short DRX cycles. Moreover, the set of candidates $\{T_{DL,k}\}$ may have six entities denoted as $\{T_{DL,1}, T_{DL,2}, T_{DL,3}, T_{DL,4}, T_{DL,5}, T_{DL,6}\} = \{100, 200, 300, 400, 500, 600\}$ subframes. When an action set $A_{1,3,2}$ is taken at the decision point $d_t$, the DRX parameters $T_{DS,dt}$, $T_{DL,dt}$ and $N_{SC,dt}$ for the undergoing DRX cycles may be set as $T_{DS,1}, T_{DL,2}$ and $N_{SC,3}$. That is, the DRX parameters $T_{DS,dt}$, $T_{DL,dt}$ and $N_{SC,dt}$ may be set as 50 subframes, 200 subframes and 3 short DRX cycles, respectively. On the other hand, when another action set $A_{4,6,5}$ is taken at the next decision point $d_{t+1}$, the DRX parameters $T_{DS,dt+1}, T_{DL,dt+1}$ and $N_{SC,dt+1}$ for the subsequent DRX cycles may be set as $T_{DS,4}, T_{DL,5}$ and $N_{SC,6}$ respectively. In other words, the DRX parameters $T_{DS,dt+1}, T_{DL,dt+1}$ and $N_{SC,dt+1}$ may be set as 200 subframes, 500 subframes and 6 short DRX cycles, respectively.

As discussed above, the TDCA scheme of the present embodiment may be performed further considering the traffic status $S_{dt}$. In other words, the action set $A_{dt}$ may be taken based on the traffic status $S_{dt}$ at the decision point $d_t$. Specifically, applying the discrete time Markov modulated Poisson process (dMMPP) model, a traffic state space S which may include a set of discrete Poisson traffic states $\{S_m\}$ may be employed to model the traffic status $S_{dt}$. That is, the traffic status $S_{dt}$ may be modeled as one entity $S_m$ of the traffic state space S. Such traffic state space S may be expressed in the following equation:

$$S = \{s_m\} = \{s_1, \ldots, s_n, \ldots, s_m, \ldots, s_M\} \qquad \text{eq. (6)}$$

Furthermore, the discrete traffic state $S_m$ may indicate a Poisson traffic with a traffic rate denoted as $\lambda_{S_m}$, and each entity of the discrete traffic states $\{S_m\}$ may transit to one another as a Markov chain with a transition probability matrix denoted as T. The transition probability matrix T may include a set of transition probabilities $\{q_{m,n}\}$, wherein the transition probability $q_{m,n}$ may indicate the transition probability for a traffic state $S_m$ transiting to another traffic state $S_n$.

Based on the discrete traffic states $\{S_m\}$ and the associated transition probability matrix T thereof, an appropriate action set $A_{dt}$ may be taken to adjust the DRX parameters $T_{DS}$, $T_{DL}$ and $N_{SC}$ and in turn achieve optimal performance of the DRX operation. The base station 11 illustrated in FIG. 1A may include a device 20, which may perform a selection scheme to take such an appropriate action set $A_{dt}$, as will be discussed in the following paragraphs by reference to FIGS. 3A and 3B.

Figure 3B:
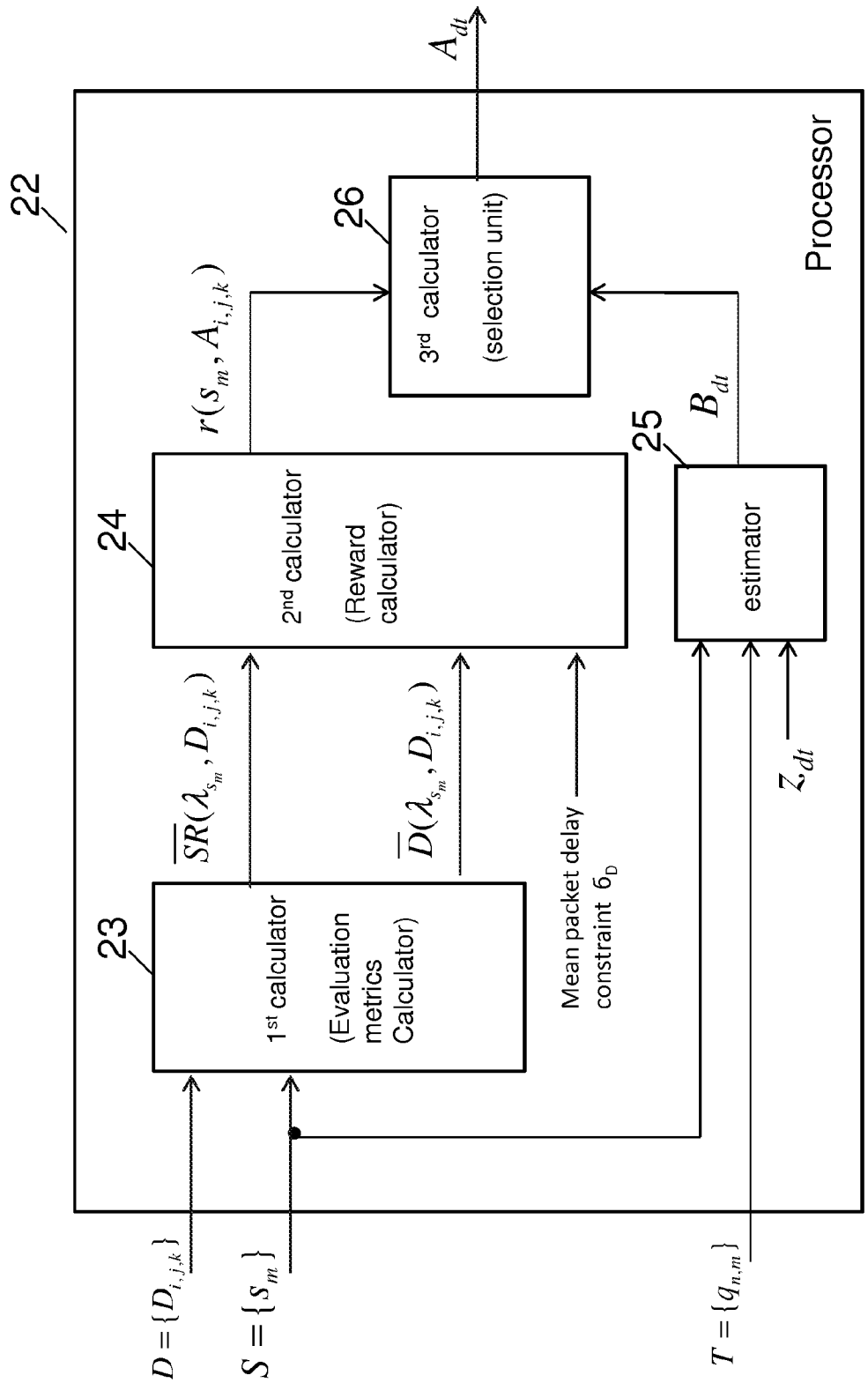
FIG. 3B is a block diagram of the processor in the device illustrated in FIG. 3A in accordance with an example embodiment.

FIG. 3A is a block diagram of the device 20 for performing the TDCA scheme in accordance with an example embodiment. Referring to FIG. 3A, the device 20 may include a storage device 21 and a processor 22. Specifically, the storage device 21 may store the group of DRX parameter sets $\{D_{i,j,k}\}$, the set of discrete traffic states $\{s_m\}$ and the transition probability matrix T associated with $\{s_m\}$. Furthermore, the processor 22 may be configured to calculate evaluation metrics associated with each DRX parameter set $D_{i,j,k}$ under a corresponding traffic state $s_m$. Moreover, the processor 22 may be further configured to calculate an estimated traffic state (denoted as "belief state $B_{dt}$") according to the set of discrete traffic states $\{s_m\}$ and the associated transition probability matrix T. In addition, based on the calculated evaluation metrics and estimated traffic state, the processor 22 may select an appropriate DRX parameter set $D_{i,j,k}$ (e.g., to take an appropriate action set $A_{dt}$). The calculation schemes for the evaluation metrics and the estimated traffic state and the selection scheme for taking an appropriate action set $A_{dt}$, which may be performed by the processor 22, will be discussed in the following paragraphs by reference to FIGS. 3B to 7A.

FIG. 3B is a block diagram of the processor 22 in the device 20 illustrated in FIG. 3A in accordance with an example embodiment. Referring to FIG. 3B, the processor 22 may include a first calculator 23, a second calculator 24, a third calculator 26 and an estimator 25. Specifically, the first calculator 23 may serve as an "evaluation metrics calculator" to calculate evaluation metrics associated with each DRX parameter set $D_{i,j,k}$ under a corresponding traffic state $s_m$. The evaluation metrics may include a sleeping ratio $\overline{SR}(\lambda_{s_m}, D_{i,j,k})$ and a mean packet delay $\overline{D}(\lambda_{s_m}, D_{i,j,k})$ The sleeping ratio $\overline{SR}(\lambda_{s_m}, D_{i,j,k})$ may be defined as the fraction of time that the UE 12 does not monitor the PDCCH (e.g., the fraction of time that the UE 12 turns off its receiving circuit). Hence, the sleeping ratio $\overline{SR}(\lambda_{s_m}, D_{i,j,k})$ may indicate the power saving efficiency associated with the DRX parameter set $D_{i,j,k}$ with a traffic load $\lambda_{s_m}$.

Furthermore, the mean packet delay $\overline{D}(\lambda_{s_m}, D_{i,j,k})$ may include a waiting time in the buffer of the evolved NodeB (eNB) and a queuing time for which the eNB may process other transmission assignments, when the DRX parameter set $D_{i,j,k}$ is selected. In other words, the mean packet delay $\overline{D}(\lambda_{s_m}, D_{i,j,k})$ may indicate a delay of the data transmission between the base station 11 and the UE 12 and in turn the degradation of the quality-of-service (QoS) for the mobile communication system 10.

The sleeping ratio $\overline{SR}(\lambda_{s_m}, D_{i,j,k})$ and the mean packet delay $\overline{D}(\lambda_{s_m}, D_{i,j,k})$ may respectively indicate the benefit and drawback to the performance of the DRX operation under the traffic state $s_m$ with the traffic rate $\lambda_{s_m}$, when the DRX parameter set $D_{i,j,k}$ is selected. However, a selected DRX parameter set $D_{i,j,k}$ which may lead to a larger sleeping ratio $\overline{SR}(\lambda_{s_m}, D_{i,j,k})$ and thus benefit the performance of the DRX operation, may meanwhile cause a larger mean packet delay $\overline{D}(\lambda_{s_m}, D_{i,j,k})$ and thus degrade the performance of the DRX operation. Therefore, a DRX parameter set $D_{i,j,k}$, which may cause a mean packet delay $\overline{D}(\lambda_{s_m}, D_{i,j,k})$ larger than a predefined value, may be unfeasible. The action set $A_{i,j,k}$ which corresponds to such unfeasible DRX parameter set $D_{i,j,k}$ may be discarded when performing the selection scheme.

Moreover, the second calculator 24 may serve as an "reward calculator" to calculate a reward $r(s_m, A_{i,j,k})$ based on the sleeping ratio $\overline{SR}(\lambda_{s_m}, D_{i,j,k})$, the mean packet delay $\overline{D}(\lambda_{s_m}, D_{i,j,k})$ and a given constraint $\partial_D$. Similar to the sleeping ratio $\overline{SR}(\lambda_{s_m}, D_{i,j,k})$, the reward $r(s_m, A_{i,j,k})$ may also indicate a benefit to the performance of the DRX operation when an action set $A_{i,j,k}$ is taken. Hence, the reward $r(s_m, A_{i,j,k})$ associated with the action set $A_{i,j,k}$ may equal the sleeping ratio) $\overline{SR}(\lambda_{s_m}, D_{i,j,k})$ associated with a DRX parameter set $D_{i,j,k}$ wherein the DRX parameter set $D_{i,j,k}$ corresponds to the action set $A_{i,j,k}$.

As discussed above, a DRX parameter set $D_{i,j,k}$ which may cause a mean packet delay $\overline{D}(\lambda_{s_m}, D_{i,j,k})$ larger than a predefined value may be unfeasible. Thus, the DRX parameter set $D_{i,j,k}$ which may cause a mean packet delay $\overline{D}(\lambda_{s_m}, D_{i,j,k})$ larger than the given constraint $\partial_D$ may be discarded, and the caused sleeping ratio $\overline{SR}(\lambda_{s_m}, D_{i,j,k})$ may not be taken as the reward $r(s_m, A_{i,j,k})$ thereof. For such case, the reward $r(s_m, A_{i,j,k})$ associated with an unfeasible action set $A_{i,j,k}$ may be set as a predefined value. Such a predefined value may exemplarily include a relatively small value, for example, zero.

In addition, the estimator 25 may function to calculate the belief state $B_{dt}$ which may indicate the estimated traffic state, and the third calculator 26 may serve as a "selection unit" to perform the selection scheme. Based on the belief state $B_{dt}$ and the reward $r(s_m, A_{i,j,k})$ the selection unit may perform the selection scheme to select an appropriate action set $A_{i,j,k}$. The selected action set $A_{i,j,k}$ may have the highest reward over all possible traffic states $\{s_m\}$.

Figure 4A:
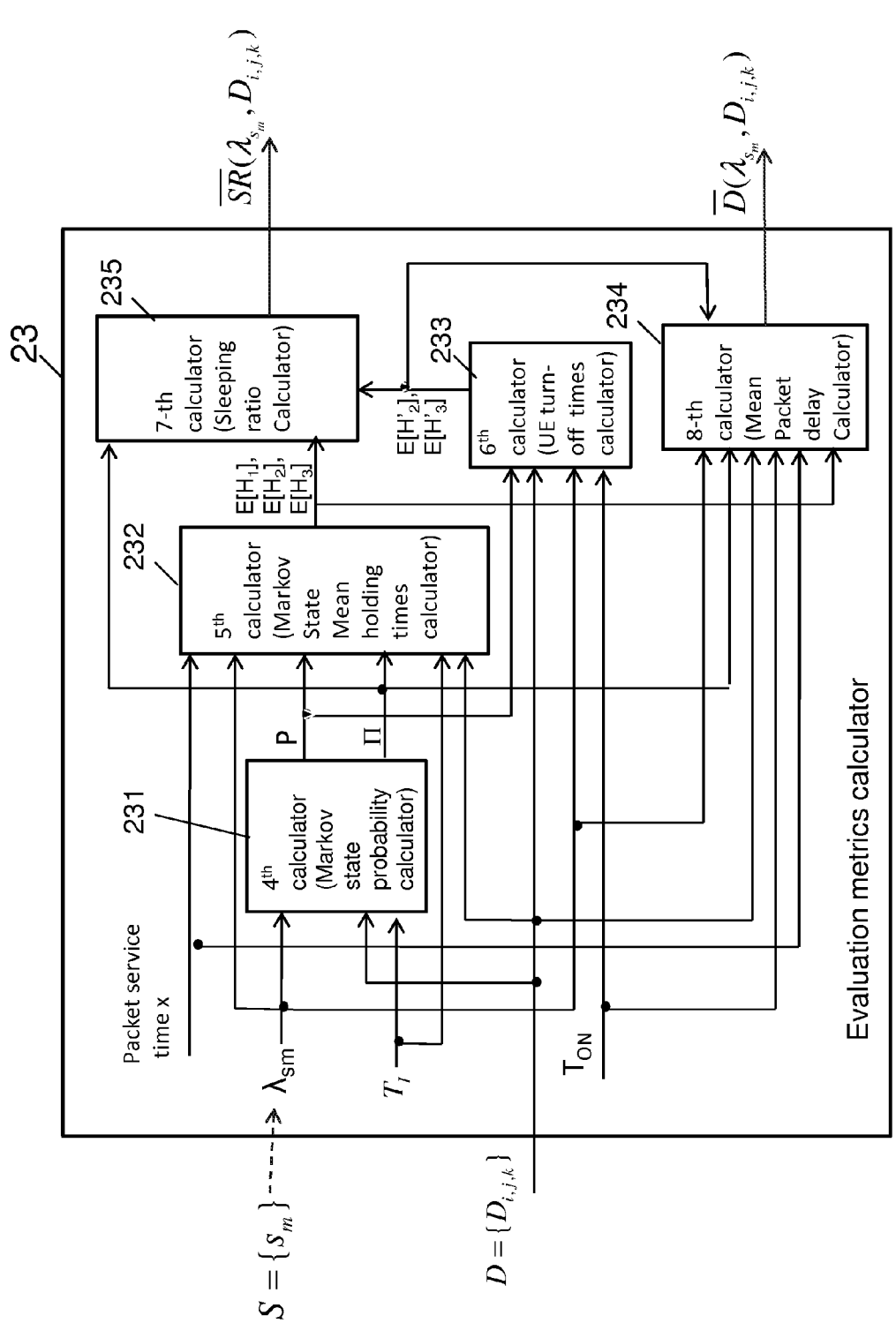
FIG. 4A is a block diagram of the evaluation metrics calculator in the processor illustrated in FIG. 3B in accordance with an example embodiment.

FIG. 4A is a block diagram of the evaluation metrics calculator in the processor 22 illustrated in FIG. 3B in accordance with an example embodiment. Referring to FIG. 4A, the evaluation metrics calculator may include a fourth, a fifth, a sixth, a seventh and an eighth calculators for calculating the evaluation metrics (e.g., the sleeping ratio $\overline{SR}(\lambda_{s_m}, D_{i,j,k})$ and mean packet delay $\overline{D}(\lambda_{s_m}, D_{i,j,k})$). For detailed discussion of the calculation scheme performed by the evaluation metrics calculator, Markov states associated with the DRX operation will be firstly discussed in the following paragraphs by reference to FIGS. 4B and 4C.

Figure 4B:
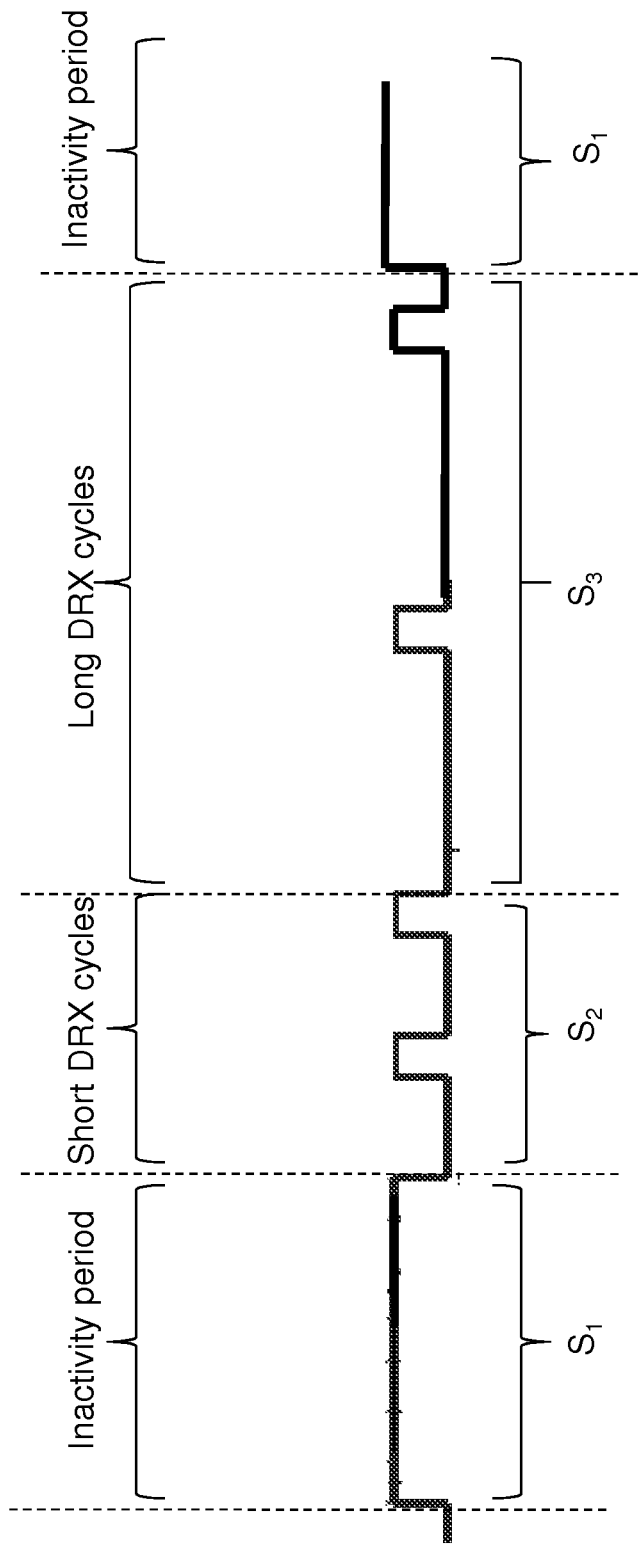
FIG. 4B illustrates the Markov states associated with the DRX operation in accordance with an example embodiment.

FIG. 4B illustrates the Markov states associated with the DRX operation in accordance with an example embodiment. Referring to FIG. 4B, in the DRX operation, the inactivity period and the periods of the short DRX cycles and the long DRX cycles may be indicated as a first state $S_1$, a second state $S_2$ and a third state $S_3$, respectively. In the state $S_1$, the UE 12 may be in the inactivity period and thus continuously listen to the PDCCH. Furthermore, in the state $S_2$, the UE 12 may discontinuously monitor the PDCCH with the short DRX cycles. Moreover, in the state $S_3$, the UE 12 may discontinuously monitor the PDCCH with the long DRX cycles. The behavior that the UE 12 may be switched among the states $S_1$, $S_2$ and $S_3$ may be modeled by semi-Markov process, as will be discussed in the following paragraphs by reference to FIG. 4C.

Figure 4C:
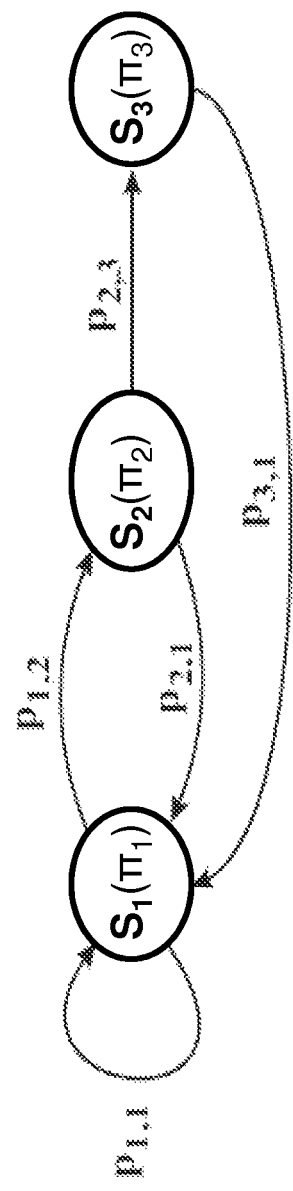
FIG. 4C is a state diagram of the DRX operation in accordance with an example embodiment.

FIG. 4C is a state diagram of the DRX operation in accordance with an example embodiment. Referring to FIG. 4C, the UE 12 may stay in the state $S_1$ with a probability denoted as $P_{1,1}$. Furthermore, the UE 12 may be switched from the state $S_1$ to the state $S_2$ with a transition probability denoted as $P_{1,2}$, and switched from the state $S_2$ back to the state $S_1$ with a transition probability denoted as $P_{2,1}$. Moreover, the UE 12 may be switched from the state $S_2$ to the state $S_3$ with a transition probability denoted as $P_{2,3}$, and switched from the state $S_3$ back to the state $S_1$ with a transition probability denoted as $P_{3,1}$. The transition probabilities $P_{1,1}$, $P_{1,2}$, $P_{2,1}$, $P_{2,3}$ and $P_{3,1}$ may form a Markov state transition probability matrix denoted as "P", that may be expressed in equation (7) below:

$$P = \begin{bmatrix} P_{1,1} & P_{1,2} & 0 \\ P_{2,1} & 0 & P_{2,3} \\ 1 & 0 & 0 \end{bmatrix} \quad \text{eq. (7)}$$

Furthermore, based on equation (7) and by applying Poisson process to model the traffic between the base station 11 and the UE 12, the Markov state transition probability matrix P may be formulated in the following equation:

$$P = \begin{bmatrix} 1 - e^{-\lambda_{Sm} T_I} & e^{-\lambda_{Sm} T_I} & 0 \\ 1 - e^{-\lambda_{Sm} N_{SC,j} T_{DS,i}} & 0 & e^{-\lambda_{Sm} N_{SC,j} T_{DS,i}} \\ 1 & 0 & 0 \end{bmatrix} \quad \text{eq. (8)}$$

In addition, stationary distributions denoted as "$\pi_1$", "$\pi_2$" and "$\pi_3$", by which the UE 12 may stay in the Markov states $S_1$, $S_2$ and $S_3$, respectively, may be formulated in the following equations:

$$\pi_1 = \frac{1}{1 + p_{1,2} + p_{1,2} \times p_{2,3}} \quad \text{eq. (9)}$$

$$\pi_2 = \frac{p_{1,2}}{1 + p_{1,2} + p_{1,2} \times p_{2,3}} \quad \text{eq. (10)}$$

$$\pi_3 = \frac{p_{1,2} \times p_{2,3}}{1 + p_{1,2} + p_{1,2} \times p_{2,3}} \quad \text{eq. (11)}$$

Utilizing equations (8) to (11) the Markov state transition probability matrix P and stationary distribution $\Pi = \{\pi_1, \pi_2, \pi_3\}$ may be calculated by the fourth calculator illustrated in FIG. 4A. The calculated Markov state transition probability matrix P and stationary distribution $\Pi$ may be provided for the fifth calculator to calculate Markov state mean holding times $E[H_1]$, $E[H_2]$ and $E[H_3]$, as will be discussed in the following paragraphs by reference to FIG. 4D.

Figure 4D:
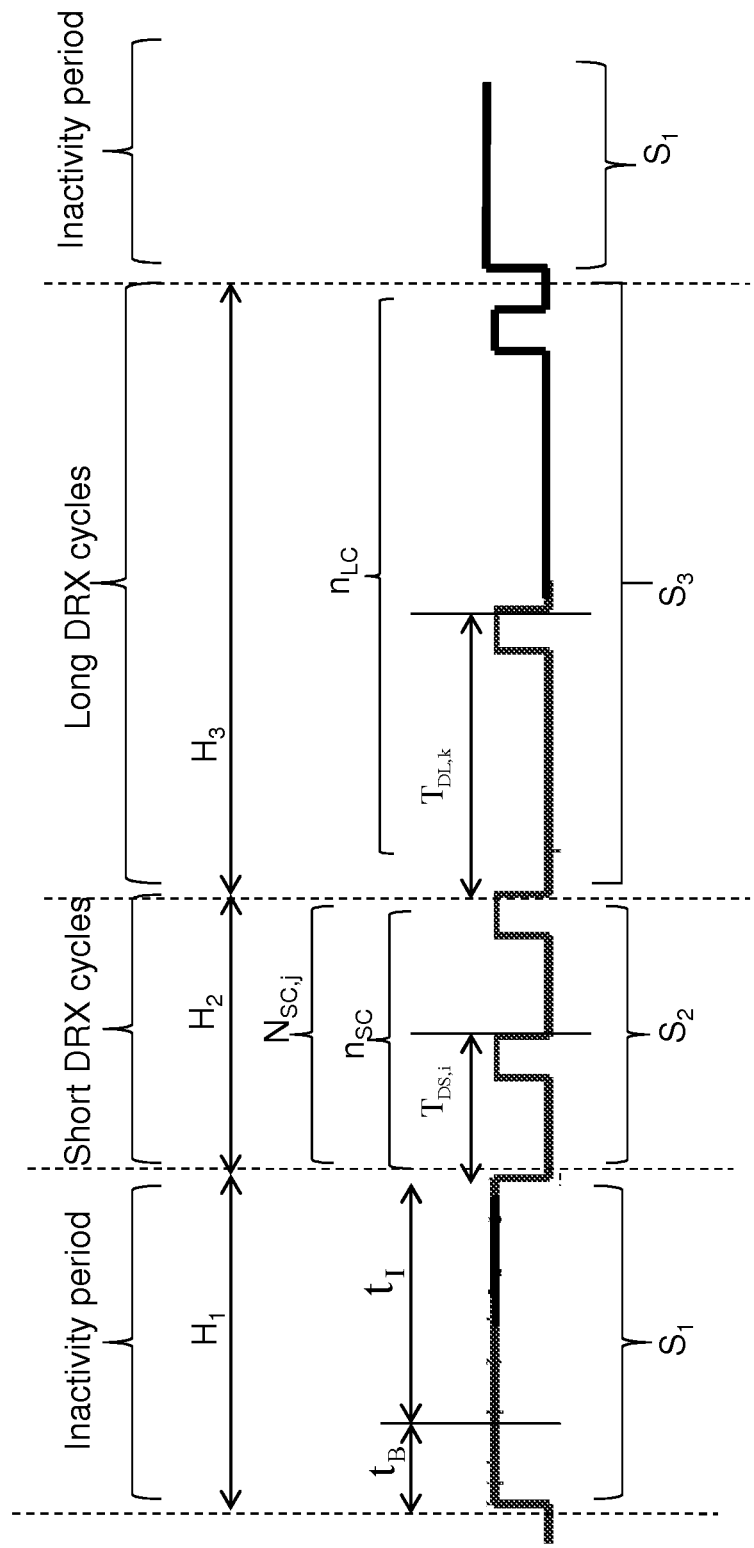
FIG. 4D illustrates the Markov states mean holding times associated with the DRX operation in accordance with an example embodiment.

FIG. 4D illustrates the Markov states mean holding times associated with the DRX operation in accordance with an example embodiment. Referring to FIG. 4D, the UE 12 may be configured to operate in the inactivity period (e.g., stay in the state $S_1$) for a time duration denoted as "holding time $H_1$". Furthermore, the UE 12 may be configured to operate with the short DRX cycles (e.g., stay in the state $S_2$) for a time duration denoted as "holding time $H_2$". Moreover, the UE 12 may be configured to operate with the long DRX cycles (e.g., stay in the state $S_3$) for a time duration denoted as "holding time $H_3$". The mean values for holding times $H_1$, $H_2$ and $H_3$ may be denoted as "mean holding times $E[H_1]$, $E[H_2]$ and $E[H_3]$", respectively. Specifically, the holding time $H_1$ for which the UE 12 may stay in the state $S_1$ may include a busy period $t_B$ and a inactive period $t_1$. The busy period $t_B$ may indicate a period for the UE 12 to process data transmissions through the downlink channel between the base station 11 and the UE 12, while the inactive period $t_1$ may indicate a period for which the UE 12 may be idle before the Inactivity Timer expires or restarts. By applying the Poisson process to model the traffic between the base station 11 and the UE 12, the mean holding time $E[H_1]$ may be formulated in the following equation:

$$E[H_1] = E[t_B] + E[t_I] \quad \text{eq. (12)}$$
$$= \left\{ \frac{\pi_1 p_{1,1} + \pi_2 p_{2,1} \lambda_{Sm} T_{DS,i} + \pi_3 p_{3,1} \lambda_{Sm} T_{DL,k}}{\pi_1 p_{1,1} + \pi_2 p_{2,1} + \pi_3 p_{3,1}} \right\} E[X] +$$
$$\left\{ \frac{1 - e^{-\lambda_{Sm} T_I} - \lambda_{Sm} T_I e^{-\lambda_{Sm} T_I}}{\lambda_{Sm}} \right\}$$

where $E[X]$ represents the mean value of the packet service time.

Furthermore, the holding time $H_2$ for which the UE 12 may stay in the state $S_2$ may depend on the number of short DRX cycles (denoted as $n_{SC}$) that are experienced by the UE 12. In other words, the holding time $H_2$ may equal the product of the time duration of a single short DRX cycle $T_{DS,i}$ and the number of experienced short DRX cycles $n_{SC}$. The mean value of $n_{SC}$ under a case that the UE 12 may be switched from the state $S_2$ to the state $S_1$ with the probability $P_{2,1}$, which may be denoted as $E[n_{SC}|S_2 \to S_1]$, may be formulated in the following equation, if a geometric distribution of $n_{SC}$ is given:

$$E[n_{SC} | S_2 \to S_1] = E[n_{SC} | 1 \le n_{SC} \le N_{SC,j}] \quad \text{eq. (13)}$$
$$= \frac{\sum_{l=1}^{N_{SC,j}} l \times e^{-\lambda_{Sm} T_{DS,i}(l-1)} (1 - e^{-\lambda_{Sm} T_{DS,i}})}{\sum_{l=1}^{N_{SC,j}} e^{-\lambda_{Sm} T_{DS,i}(l-1)} (1 - e^{-\lambda_{Sm} T_{DS,i}})}$$

On the other hand, the mean value of $n_{SC}$ under the other case that the UE 12 may be switched from the state $S_2$ to the state $S_3$ with the probability $P_{2,3}$, which may be denoted as $E[n_{SC}|S_2 \to S_3]$, may equal $N_{SC,j}$ since the maximum number $N_{SC,j}$ of short DRX cycles has been reached. From the above, considering both the cases for those the UE 12 may be switched from the state $S_2$ to the state $S_1$ and switched from the state $S_2$ to the state $S_3$, the mean holding time $E[H_2]$ may be formulated in the following equation:

$$E[H_2] = \{p_{2,1} \times E[n_{SC}|S_2 \to S_1] + p_{2,3} \times E[n_{SC}|S_2 \to S_3]\} \times T_{DS,i} \quad \text{eq. (14)}$$
$$= \left[ p_{2,1} \times \frac{\sum_{l=1}^{N_{SC,j}} l \times e^{-\lambda_{Sm} T_{DS,i}(l-1)} (1 - e^{-\lambda_{Sm} T_{DS,i}})}{\sum_{l=1}^{N_{SC,j}} e^{-\lambda_{Sm} T_{DS,i}(l-1)} (1 - e^{-\lambda_{Sm} T_{DS,i}})} + p_{2,3} \times N_{SC,j} \right] \times T_{DS,i}$$

Moreover, the holding time $H_3$ for which the UE 12 may stay in the state $S_3$ may depend on the number of long DRX cycles (denoted as $n_{LC}$) that are experienced by the UE 12. In other words, the holding time $H_3$ may equal the time duration of a single long DRX cycle $T_{DL,k}$ producing the number of experienced long DRX cycles $n_{LC}$. The mean value of $n_{LC}$ that is denoted as $E[n_{LC}]$, may be equivalent to $$\frac{1}{Pr[t_{ip} \le T_{DL,k}]}$$

if a geometric distribution of $n_{LC}$ is given. Therefore, the mean holding time $E[H_3]$ may be formulated in the following equation:

$$E[H_3] = E[n_{LC}] \times T_{DL,k} = \left( \frac{T_{DL,k}}{1 - e^{-\lambda_{Sm} T_{DL,k}}} \right) \quad \text{eq. (15)}$$

Utilizing equations (12), (14) and (15), the Markov state mean holding times $E[H_1]$, $E[H_2]$ and $E[H_3]$ may be calculated by the fifth calculator illustrated in FIG. 4A. On the other hand, the calculated Markov state transition probability matrix P and stationary distribution Π may be provided for the sixth calculator to calculate UE turn-off times $E[H'_2]$ and $E[H'_3]$, as will be discussed in the following paragraphs by reference to FIG. 4E.

Figure 4E:
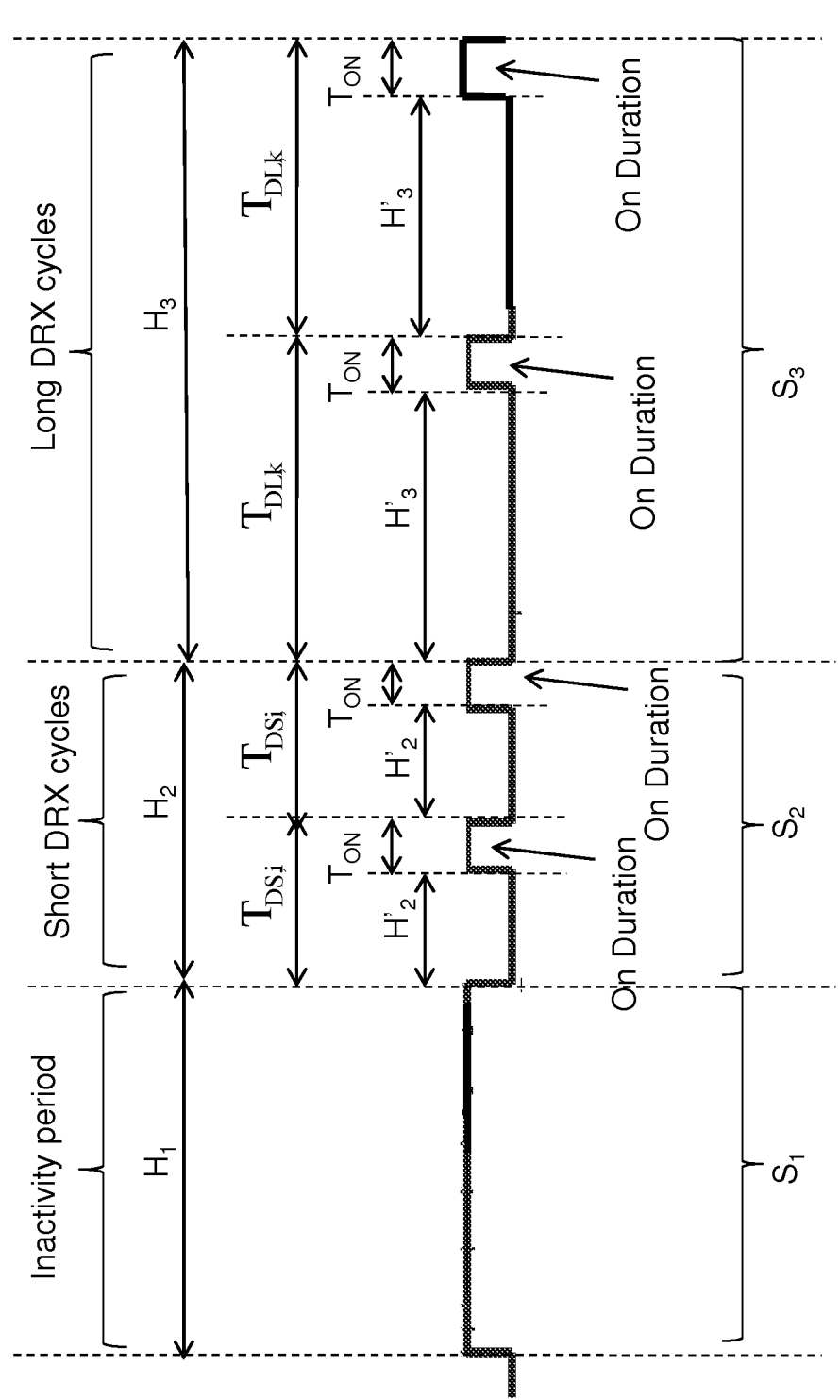
FIG. 4E illustrates the UE turn-off times associated with the DRX operation in accordance with an example embodiment.

FIG. 4E illustrates the UE turn-off times associated with the DRX operation in accordance with an example embodiment. Referring to FIG. 4E, in the states $S_2$ and $S_3$, the UE 12 may turn on its receiver to monitor the PDCCH in the On Duration periods with a time duration denoted as Ton. On the other hand, in the state $S_2$ the UE 12 may turn off its receiver in periods with time duration denoted as "UE turn-off time $H'_2$" so as to save power. Likewise, in the state $S_3$ the UE may turn off its receiver in periods with time duration denoted as "UE turn-off time $H'_3$". Similar to the derivations of the mean holding times $E[H_1]$, $E[H_2]$ and $E[H_3]$ (except replacing $T_{DS,i}$ and $T_{DL,k}$ with $T_{DS,i}-T_{on}$ and $T_{DL,k}-T_{on}$, respectively), the mean values for the UE turn-off times $H'_2$ and $H'_3$ may be formulated in the following equations, respectively:

$$E[H'_2] = \left[ p_{2,1} \times \frac{\sum_{l=1}^{N_{SC,j}} l \times e^{-\lambda_{Sm} T_{DS,i}(l-1)} (1 - e^{-\lambda_{Sm} T_{DS,i}})}{\sum_{l=1}^{N_{SC,j}} e^{-\lambda_{Sm} T_{DS,i}(l-1)} (1 - e^{-\lambda_{Sm} T_{DS,i}})} + p_{2,3} \times N_{SC,j} \right] \times$$
$$(T_{DS,i} - T_{on}) \quad \text{eq. (16)}$$

$$E[H'_3] = \left(\frac{T_{DL,k} - T_{ON}}{1 - e^{\lambda_{Sm}T_{DL,k}}}\right) \quad \text{eq. (17)}$$

Utilizing equations (16) and (17), the mean values of the UE turn-off times $E[H'_2]$ and $E[H'_3]$ may be calculated by the sixth calculator illustrated in FIG. 4A.

Furthermore, the calculated mean UE turn-off times $E[H'_2]$ and $E[H'_3]$, the calculated Markov state mean holding times $E[H_1]$, $E[H_2]$ and $E[H_3]$, and the calculated stationary distribution $\Pi$ may be provided for the seventh calculator to calculate sleeping ratio $\overline{SR}(\lambda_{s_m}, D_{i,j,k})$. Specifically, as described above, the sleeping ratio $\overline{SR}(\lambda_{s_m}, D_{i,j,k})$ may be defined as the fraction of time that the UE 12 does not monitor the PDCCH (e.g., the fraction of time that the UE 12 turns off its receiving circuit). Therefore, the sleeping ratio $\overline{SR}(\lambda_{s_m}, D_{i,j,k})$ may be formulated in the following equation:

$$\overline{SR}(\lambda_{s_m}, D_{i,j,k}) = \frac{\pi_2 E[H'_2] + \pi_3 E[H'_3]}{\pi_1 E[H_1] + \pi_2 E[H_2] + \pi_3 E[H_3]} \quad \text{eq. (18)}$$

Utilizing equation (18), the seventh calculator illustrated in FIG. 4A may be configured to calculate the sleeping ratio $\overline{SR}(\lambda_{s_m}, D_{i,j,k})$.

Moreover, the calculated UE 12 turn-off times $E[H'_2]$ and $E[H'_3]$, the calculated Markov state mean holding times $E[H_1]$, $E[H_2]$ and $E[H_3]$, and the calculated stationary distribution $\Pi$ may be further provided for the eighth calculator to calculate mean packet delay $\overline{D}(\lambda_{s_m}, D_{i,j,k})$. Specifically, as described above, the mean packet delay $\overline{D}(\lambda_{s_m}, D_{i,j,k})$ may indicate the waiting time in the buffer of the eNB and the queuing time that the eNB may process other transmission assignments. The mean value of the waiting time may be formulated as $$\frac{(T_{DS,i} - T_{ON})}{2},$$

while the mean queuing time may be formulated as $$\frac{\lambda_{Sm}(T_{DS,i} - T_{ON})E[X]}{2},$$

when a packet may arrive in a short DRX cycle. From the above, the mean packet delay for short DRX cycles (e.g., denoted as $E[W_{DS}]$) and the mean packet delay for long DRX cycles (e.g., denoted as $E[W_{DL}]$) may be formulated in the following equations, respectively:

$$E[W_{DS}] = \frac{(T_{DS,i} - T_{ON})}{2} + \frac{\lambda_{Sm}(T_{DS,i} - T_{ON})E[X]}{2} \quad \text{eq. (19)}$$

and $$E[W_{DL}] = \frac{(T_{DS,k} - T_{ON})}{2} + \frac{\lambda_{Sm}(T_{DL,k} - T_{ON})E[X]}{2} \quad \text{eq. (20)}$$

From the above, the mean packet delay $\overline{D}(\lambda_{s_m}, D_{i,j,k})$ associated with the DRX parameter set $D_{i,j,k}$ under a traffic state $s_m$ with a Poisson traffic rate $\lambda_{s_m}$ may be formulated in the following equation:

$$\overline{D}(\lambda_{s_m}, D_{i,j,k}) = \frac{\pi_2 E[H'_2]E[W_{DS}] + \pi_3 E[H'_3]E[W_{DL}]}{\pi_1 E[H_1] + \pi_2 E[H_2] + \pi_3 E[H_3]} \quad \text{eq. (21)}$$

Utilizing equation (21), the eighth calculator illustrated in FIG. 4A may be configured to calculate the mean packet delay $\overline{D}(\lambda_{s_m}, D_{i,j,k})$.

Figure 5A:
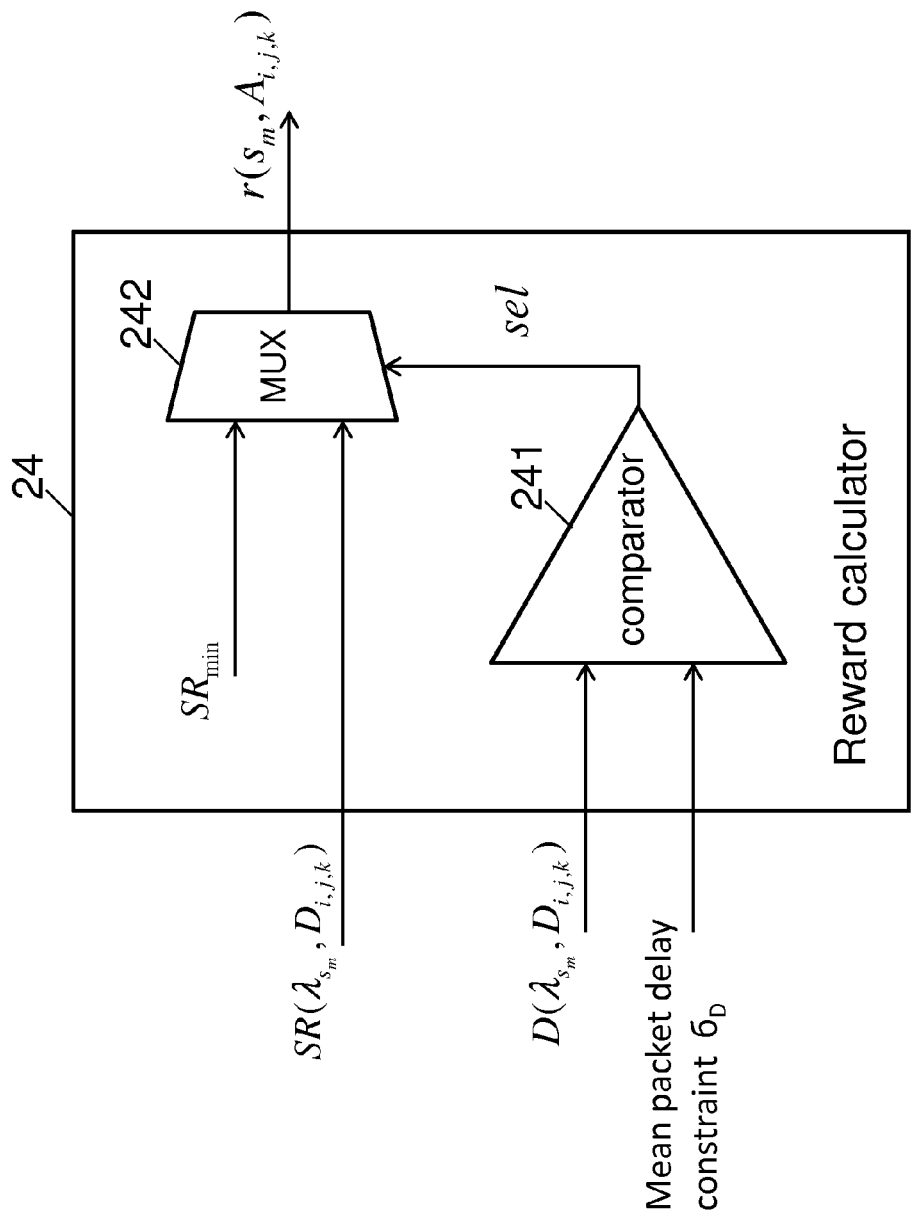
FIG. 5A is a block diagram of the reward calculator in the processor illustrated in FIG. 3B in accordance with an example embodiment.

FIG. 5A is a block diagram of the reward calculator 24 in the processor 22 illustrated in FIG. 3B in accordance with an example embodiment. Referring to FIG. 5A, the reward calculator 24 may include a comparator 241 and a multiplexer (MUX). The comparator 241 may serve to compare the mean packet delay $\overline{D}(\lambda_{s_m}, D_{i,j,k})$ associated with the DRX parameter set $D_{i,j,k}$ with the given constraint $\partial_D$ (e.g., mean packet delay constraint) and thus generate a comparing result denoted as "sel". The comparing result sel may serve as a selecting signal of the MUX 242, and the MUX 242 may serve to select one of the mean sleeping ratio $SR(\lambda_{s_m}, D_{i,j,k})$ associated with the DRX parameter set $D_{i,j,k}$ and a predefined value (denoted as "$SR_{min}$") in response to the selecting signal.

If the mean packet delay $D(\lambda_{s_m}, D_{i,j,k})$ is smaller than or equivalent to the mean packet delay constraint $\partial_p$, which indicates that the action set $A_{i,j,k}$ corresponding to the associated DRX parameter set $D_{i,j,k}$ may be feasible, the comparing result sel and in turn the selecting signal of the MUX 242 may have a first value. In response to the selecting signal of the first value, the MUX 242 may select the mean sleeping ratio $SR(\lambda_{s_m}, D_{i,j,k})$, and the reward $r(s_m, A_{i,j,k})$ associated with the action set $A_{i,j,k}$ may be assigned with the mean sleeping ratio $SR(\lambda_{s_m}, D_{i,j,k})$.

On the other hand, if the mean packet delay $D(\lambda_{s_m}, D_{i,j,k})$ is larger than the mean packet delay constraint $\partial_D$, which indicates that the action set $A_{i,j,k}$ may cause a large packet delay and thus unfeasible, the comparing result sel and in turn the selecting signal of the MUX 242 may have a second value. In response to the selecting signal of the second value, the MUX 242 may select the predefined value $SR_{min}$, and the reward $r(s_m, A_{i,j,k})$ may be assigned with the predefined value $SR_{min}$. Thereby, the DRX parameter set $D_{i,j,k}$ which may cause a mean packet delay larger than the given constraint $\partial_D$ may be discarded, and the caused sleeping ratio $\overline{SR}(\lambda_{s_m}, D_{i,j,k})$ may not be taken as the reward $r(s_m, A_{i,j,k})$ thereof. In one example, the predefined value $Sk_{min}$ may include a relatively small value, such as zero.

Figure 6A:
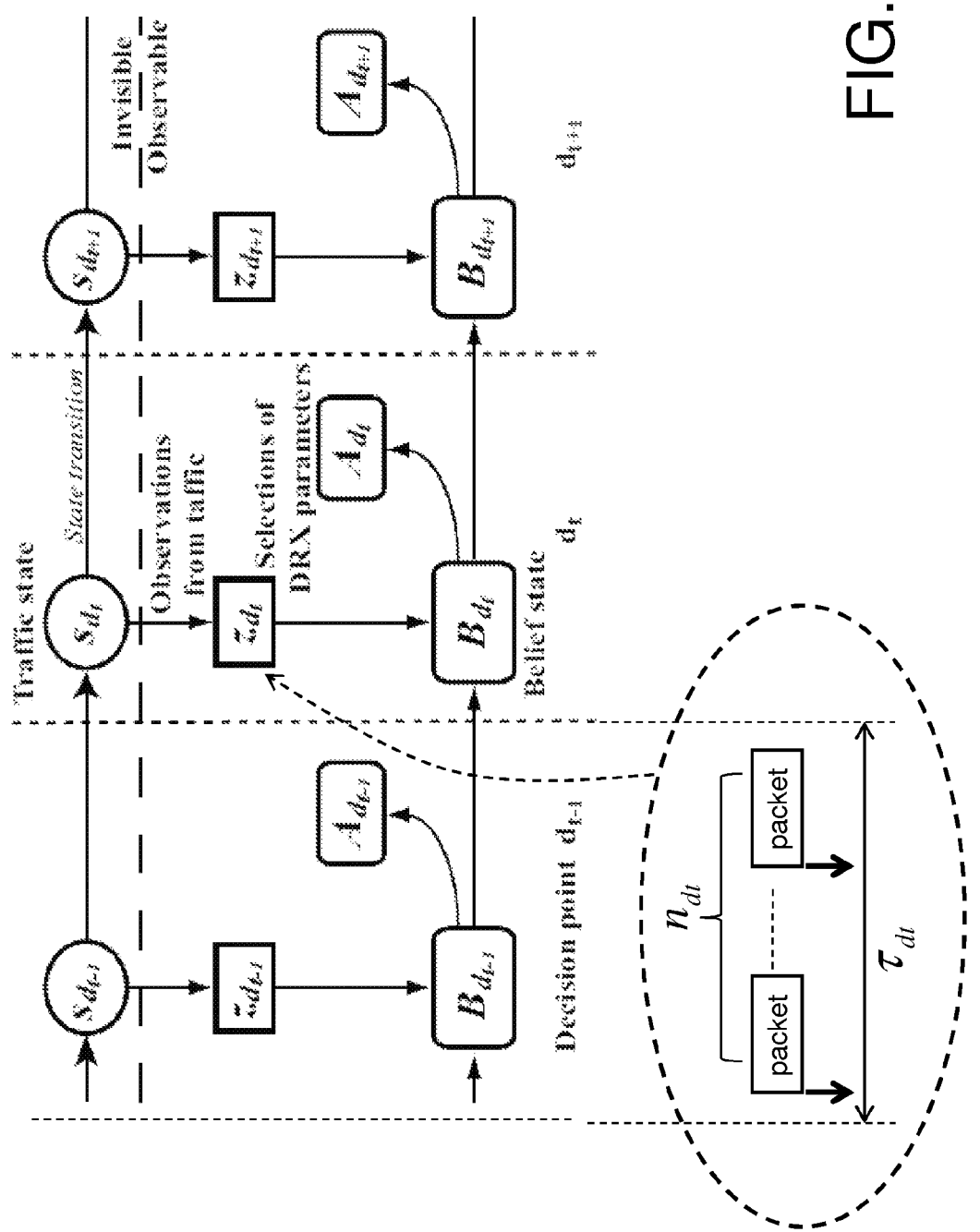
FIG. 6A is a state diagram illustrating an estimation scheme of the estimator in FIG. 3B in accordance with an example embodiment.

FIG. 5B illustrates a reward assignment algorithm in accordance with an example embodiment. Referring to FIG. 5B, the reward assignment algorithm may be performed in an iterative manner based on the sleeping ratio $SR(\lambda_{s_m}, D_{i,j,k})$, the mean packet delay $D(\lambda_{s_m}, D_{i,j,k})$ and the given mean packet delay constraint $\partial_D$. More particularly, for each DRX parameter set $D_{i,j,k}$ under each traffic state $s_m$ with traffic rate $\lambda_{s_m}$, the associated mean packet delay $D(\lambda_{s_m}, D_{i,j,k})$ may be compared with the mean packet delay constraint $\partial_D$. If the mean packet delay $D(\lambda_{s_m}, D_{i,j,k})$ is smaller than or equivalent to the mean packet delay constraint $\partial_D$, the sleeping ratio $SR(\lambda_{s_m}, D_{i,j,k})$ may be assigned as the reward $r(s_m, A_{i,j,k})$. Otherwise, if the mean packet delay $D(\lambda_{s_m}, D_{i,j,k})$ is larger than the mean packet delay constraint $\partial_D$, the associated DRX parameter set $D_{i,j,k}$ may be unfeasible. The sleeping ratio $SR(\lambda_{s_m}, D_{i,j,k})$ associated with such unfeasible DRX parameter set $D_{i,j,k}$ may be discarded, and the associated reward $r(s_m, A_{i,j,k})$ may be assigned with an relatively small value $SR_{min}$. In one example, $SR_{min}$ may be zero FIG. 6A is a state diagram illustrating an estimation scheme of the estimator 25 in FIG. 3B in accordance with an example embodiment. Referring to FIG. 6A, in the TDCA scheme of the present embodiment, an action set $A_{dt}$ at a decision point $d_t$ may be selected from all candidates of action sets $\{A_{i,j,k}\}$ considering the traffic status at the decision point $d_t$. That is, the action $A_{dt}$ may be taken according to the present traffic state $s_{dt}$ (e.g., the actual traffic state at the decision point $d_t$). However, the present traffic state $s_{dt}$ may be unavailable (e.g., invisible) for the device 20 illustrated in FIG. 3A. Accordingly, instead of considering the present traffic state $s_{dt}$, the action $A_{dt}$ may be taken considering an estimated traffic state which may be estimated base on an observation $z_{dt}$ given that a partially observable Markov decision process (POMDP) framework is utilized.

Specifically, the observation $z_{dt}$ may indicate traffic information that may be observed within a period $\tau_{dt}$ between the previous decision point $d_{t-1}$ and the present decision point $d_t$. Such traffic information may include the number of packets which may arrive within the period $\tau_{dt}$ and may be denoted as $n_{dt}$. From the above, the observation $z_{dt}$ for the POMDP framework may be defined by the following equation:

$$z_{dt} = \{n_{dt}, \tau_{dt}\} \quad \text{eq. (22)}$$

Furthermore, based on the observation $z_{dt}$, an observation function $O_{dt}$ may be defined by the following equation:

$$O_{dt} = \{o_{dt}(s_1), o_{dt}(s_2), \ldots, o_{dt}(s_m), \ldots, o_{dt}(s_M)\} \quad \text{eq. (23)}$$

From equation (23), the observation function $O_{dt}$ may include a set of weighting functions $\{o_{dt}(s_m)\}$, and the weighting function $o_{dt}(s_m)$ may indicate the possibility for the present traffic state $s_{dt}$ to be the discrete traffic state $s_m$. More particularly, given the Poisson property of the traffic state, the weighting function $o_{dt}(s_m)$ may indicate the probability for the number of packets arriving within the period $\tau_{dt}$ to be $n_{dt}$, under the discrete traffic state $s_m$. Therefore, such weighting function $o_{dt}(s_m)$ may be expressed in the following equation:

$$o_{dt}(s_m) = Pr(z_{dt} | s_m) = \frac{(\lambda_{Sm} \tau_{dt})^{n_{dt}} e^{-\lambda_{Sm} \tau_{dt}}}{n_{dt}!} \quad \text{eq. (24)}$$

Utilizing equation (24), the observation function $O_{dt}$ may be calculated. Moreover, based on the calculated observation function $O_{dt}$ a belief state $B_{dt}$ may be obtained. The belief state $B_{dt}$ may serve as the estimated traffic state based on which the action $A_{dt}$ may be taken, given that the observation $z_{dt}$ is considered under POMDP framework. Specifically, the belief state $B_{dt}$ may indicate a probability distribution over all discrete traffic states $s_m$ within the traffic state space S. Such a belief state $B_{dt}$ may include a set of entities which may be denoted as $\{b_{dt}(s_1), b_{dt}(s_2), \ldots, b_{dt}(s_m), \ldots, b_{dt}(s_M)\}$. One entity $b_{dt}(s_m)$ of $B_{dt}$ may indicate a probability for the present traffic state $s_{dt}$ to be the discrete traffic state $s_m$. All entities $\{b_{dt}(s_m)\}$ of $B_{dt}$ may further satisfy constraints as expressed in the following equations:

$$b_{dt}(s_m) \geq 0 \quad \text{eq. (25)}$$

$$\forall s_m \in S \quad \text{eq. (26)}$$

and $$\Sigma_{\forall s_m \in S} b_{dt}(s_m) = 1 \quad \text{eq. (27)}$$

In addition, the belief state $B_{dt}$ at the decision point $d_t$ may be obtained further considering the previous belief state $B_{dt-1}$. In other words, the belief state $B_{dt}$ may be obtained based on the observation function $O_{dt}$, the previous belief state $B_{dt-1}$, the Poisson traffic rates $\{\lambda_{s_m}\}$ associated with the discrete traffic states $\{s_m\}$ and the transition probability matrix T (e.g., $T = \{q_{n,m}\}$) associated with the discrete traffic states $\{s_m\}$. From the above, each entity $b_{dt}(s_m)$ of the belief state $B_{dt}$ may be formulated in the following equation, when Bayes rule is applied:

$$b_{dt}(s_m) = Pr(s_m | B_{dt-1}, z_{dt}) \quad \text{eq. (28)}$$

$$= \frac{Pr(z_{dt} | B_{dt-1}, s_m) Pr(s_m | B_{dt-1})}{Pr(z_{dt} | B_{dt-1})}$$

$$= \frac{o_{dt}(s_m) \sum_{\forall s_n \in S} q_{n,m} b_{dt-1}(s_n)}{\sum_{\forall s_m \in S} o_{dt}(s_m) \sum_{\forall s_n \in S} q_{n,m} b_{dt-1}(s_n)}$$

Utilizing equation (28), the belief state $B_{dt}$ may be calculated, and an appropriate action $A_{dt}$ may be taken based on the calculated belief state $B_{dt}$. An estimator 25 configured to calculate the estimated traffic state (e.g., the belief state $B_{dt}$) by utilizing the estimation scheme described above will be discussed in the following paragraphs by reference to FIG. 6B.

Figure 6B:
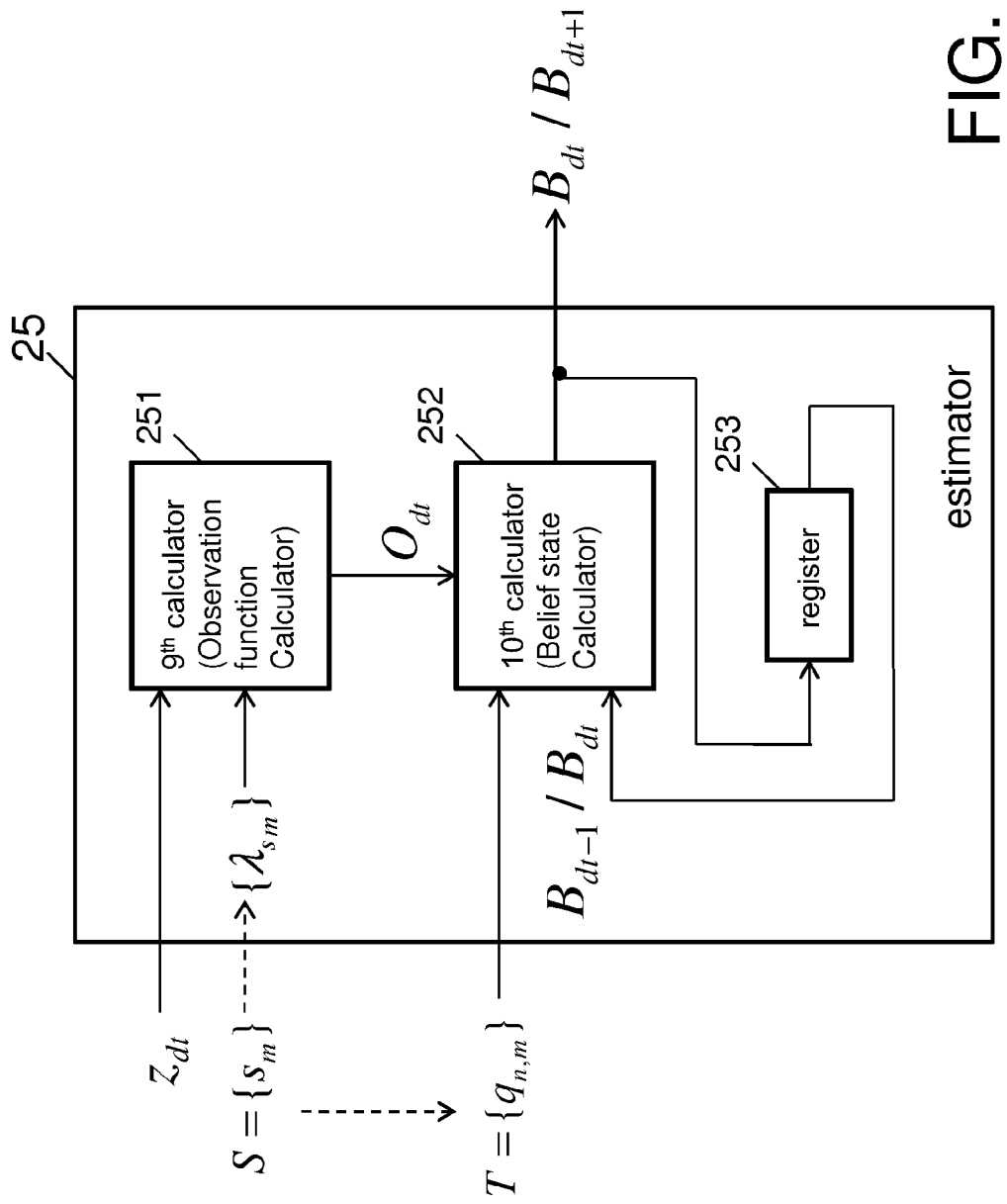
FIG. 6B is a block diagram of the estimator in the processor illustrated in FIG. 3B in accordance with an example embodiment.

FIG. 6B is a block diagram of the estimator 25 in the processor 22 illustrated in FIG. 3B in accordance with an example embodiment. Referring to FIG. 6B, the estimator 25 may include a ninth calculator 251, a tenth calculator 252 and a register 253. Specifically, the ninth calculator 251 which may serve as an "observation function calculator", may receive the observation $z_{dt}$ and the traffic state space S that may include the discrete traffic states $\{s_m\}$. The ninth calculator 251 may then retrieve the Poisson traffic rates $\{\lambda_{s_m}\}$ associated with the discrete traffic states $\{s_m\}$ from traffic state space S. Based on the received observation $z_{dt}$ and the retrieved Poisson traffic rates $\{\lambda_{s_m}\}$, the ninth calculator 251 may be configured to calculate the observation function $O_{dt}$ utilizing equation (24). The calculated observation function $O_{dt}$ may be sent to the tenth calculator.

Furthermore, the tenth calculator 252 which may serve as a "belief state calculator", may receive the calculated observation function $O_{dt}$ and the transition probability matrix T associated with the discrete traffic states $\{s_m\}$. The tenth calculator 252 may then retrieve transition probabilities $q_{n,m}$ from the transition probability matrix T. Based on the calculated observation function $O_{dt}$, the retrieved transition probabilities $q_{n,m}$ and the previous belief state $B_{dt-1}$, the tenth calculator 252 may be configured to calculate the belief state $B_{dt}$ utilizing equation (28). The calculated belief state $B_{dt}$ may then be sent to the register.

Moreover, the register 253 may serve to store the belief state $B_{dt}$ calculated at the decision point $d_t$. The stored belief state $B_{dt}$ may then serve as a previous belief state for calculating a next belief state $B_{dt+1}$ at a next decision point $d_{t+1}$.

The belief state $B_{dt}$ calculated by the estimator 25 may then be sent to the third calculator 26 (e.g., the selection unit) illustrating in FIG. 3B so as to select an appropriate action set $A_{dt}$. The selection scheme of the selection unit will be discussed in the following paragraphs by reference to FIG. 7A.

Figure 7A:
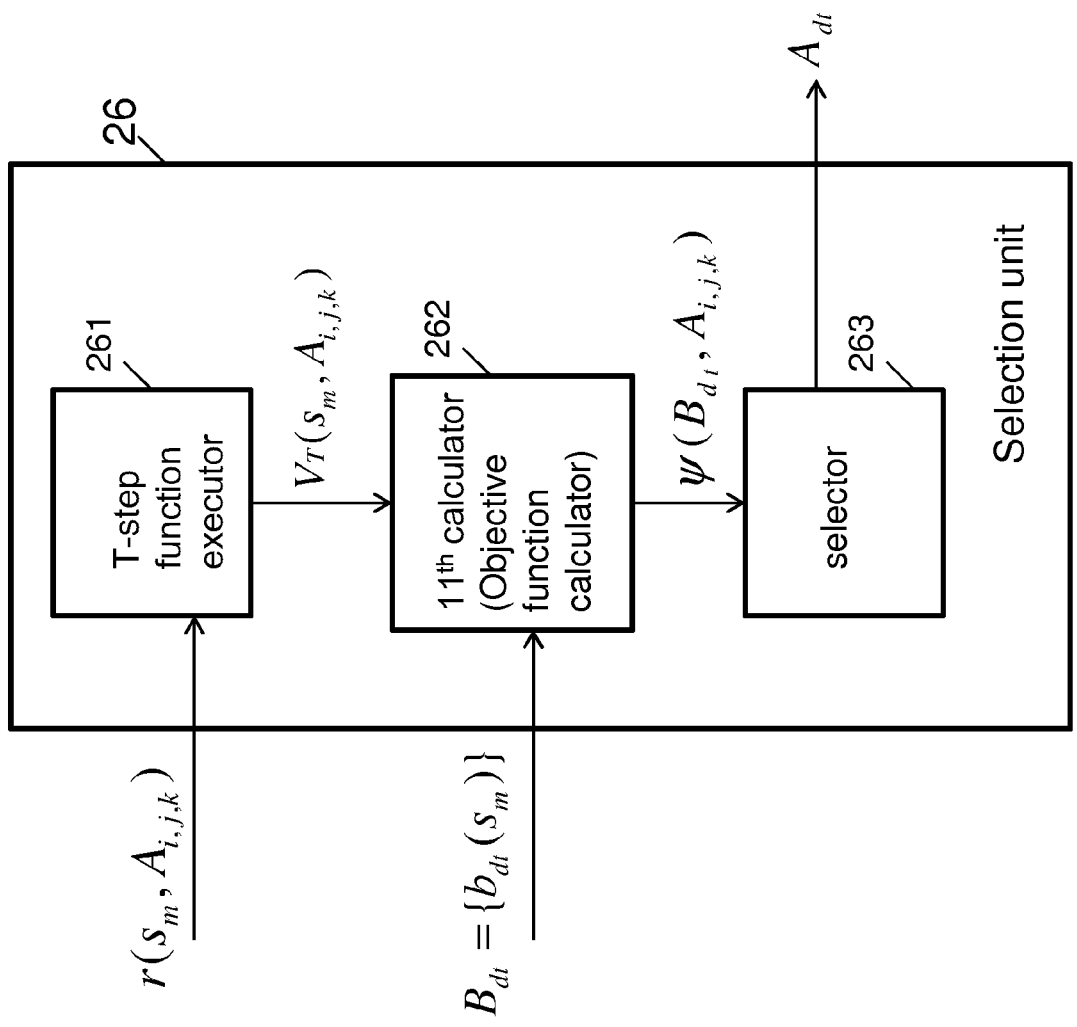
FIG. 7A is a block diagram of the selection unit in the processor illustrated in FIG. 3B in accordance with an example embodiment.

FIG. 7A is a block diagram of the selection unit in the processor 22 illustrated in FIG. 3B in accordance with an example embodiment. Referring to FIG. 7A, the selection unit 26 may include a T-step function executor 261, a eleventh calculator and a selector 263. The T-step function executor 261 may transfer the reward $r(s_m, A_{i,j,k})$ to a T-step value function $V_T(s_m, A_{i,j,k})$. Furthermore, based on the T-step value function $V_T(S_m, A_{i,j,k})$ and the belief state $B_{dt}$, the eleventh calculator which may serve as an "objective function calculator", may calculate an objective function $\Psi(B_{dt}, A_{i,j,k})$. Moreover, the selector 263 may serve to select an appropriate action set $A_{dt}$ based on the objective function $\Psi(B_{dt}, A_{i,j,k})$.

In one example, the T-step function executor 261 may be reduced to perform a one-step function. The T-step value function $V_T(s_m, A_{i,j,k})$ may thus be reduced to a one-step value function $V_1(s_m, A_{i,j,k})$ which may equal the reward function $r(s_m, A_{i,j,k})$.

Furthermore, the objective function $\Psi(B_{dt}, A_{i,j,k})$ may indicate an average of the T-step value function $V_T(S_m, A_{i,j,k})$ over all traffic states $\{s_m\}$, given that the belief state $B_{dt}$ is estimated. Therefore, the objective function $\Psi(B_{dt}, A_{i,j,k})$ may be obtained by the following equation:

$$\Psi(B_{dt}, A_{i,j,k}) = \sum_{\forall S_m \in S} b_{dt}(s_m) V_T(s_m, A_{i,j,k}) \quad \text{eq. (29)}$$

Moreover, the one associated with the maximum objective function may be selected as the appropriate action set $A_{dt}$, as will be expressed in the following equation:

$$A_{dt} = \arg\max_{\forall A_{i,j,k}} \Psi(B_{dt}, A_{i,j,k}) \quad \text{eq. (30)}$$

Such an selected action set $A_{dt}$ may implicitly have maximum sleep ratio and in turn achieve optimal performance of the DRX operation.

Figure 8A:
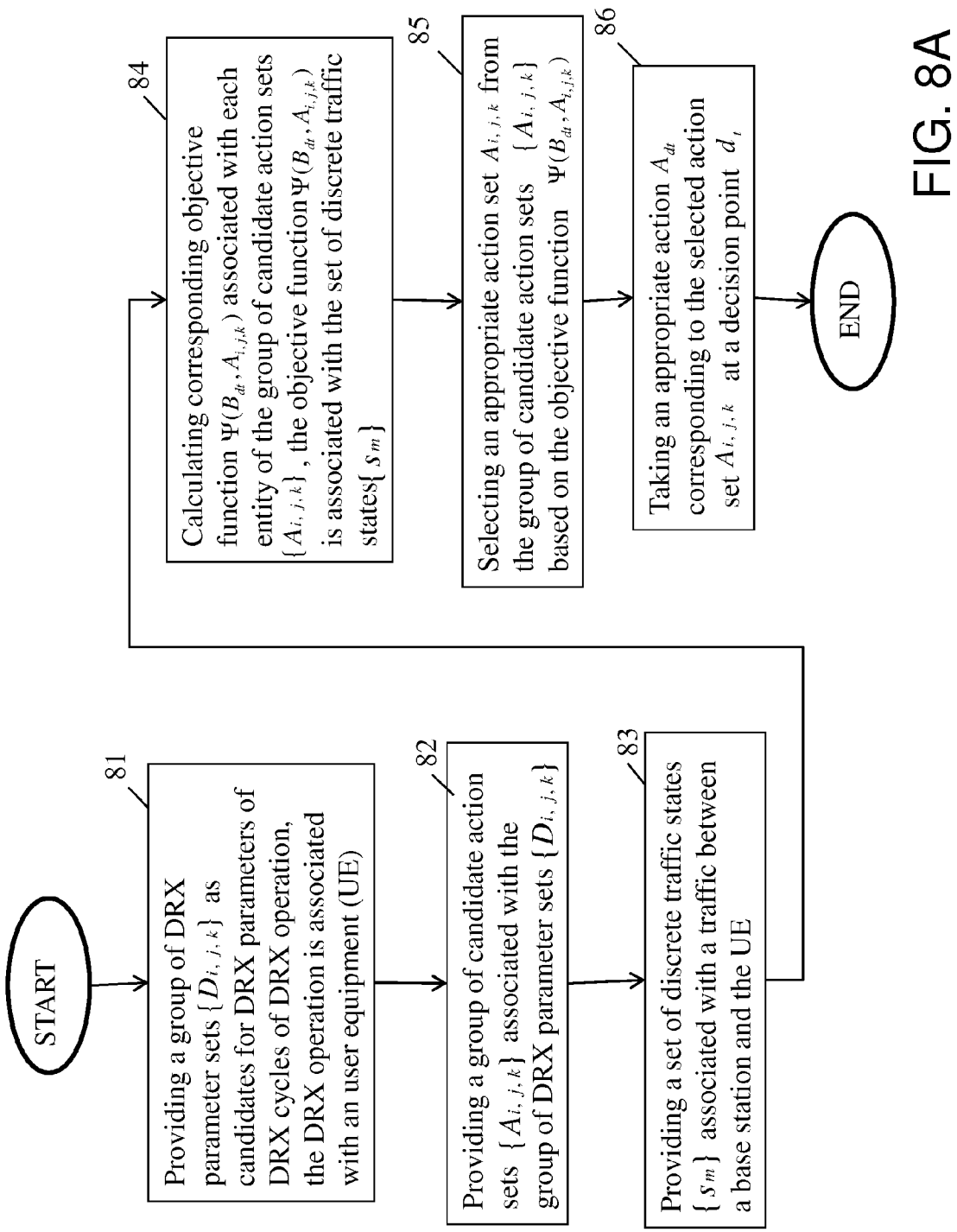
FIG. 8A is a flow diagram of a method for performing the TDCA scheme in accordance with an example embodiment.

FIG. 8A is a flow diagram of a method for performing the TDCA scheme in accordance with an example embodiment. Referring to FIG. 8A, first, at step 81, a group of DRX parameters $\{D_{i,j,k}\}$ may be provided as candidates for adjusting the DRX parameters $T_{DS,dt}$, $N_{SC,dt}$ and $T_{DL,dt}$ of the DRX cycles of the DRX operation. As discussed in the former paragraphs by reference to FIG. 2, the group of DRX parameters set $\{D_{i,j,k}\}$ may include a set of candidates $\{T_{DS,i}\}$ for the parameter $T_{DS,dt}$ a set of candidates $\{N_{SC,j}\}$ for the parameter $N_{SC,dt}$ and a set of candidates $\{T_{DL,k}\}$ for the parameter $T_{DL,dt}$. The DRX parameters $T_{DS,dt}$, $N_{SC,dt}$ and $T_{DL,dt}$ are the cycle length of the short DRX cycles, the maximum number of the short DRX cycles of the short DRX cycles, and the cycle length of the long DRX cycles respectively. The group of DRX parameters $\{D_{i,j,k}\}$ may be the candidates for setting the DRX parameters $T_{DS,dt}$, $N_{SC,dt}$ and $T_{DL,dt}$ at a decision point $d_t$. For example, the i-th candidate $T_{DS,i}$ may be set as the cycle length $T_{DS,dt}$ of the short DRX cycles, the k-th candidate $T_{DL,k}$ may be set as the cycle length $T_{DL,dt}$ of the long DRX cycles and the j-th candidate $N_{SC,j}$ may be set as the maximum number of the short DRX cycles $N_{SC,dt}$ at the decision point $d_t$.

Next, at step 82, a group of candidate action sets $\{A_{i,j,k}\}$ associated with the group of candidate DRX parameter sets $\{D_{i,j,k}\}$ may be provided. An entity $A_{i,j,k}$ of the group of candidate action sets $\{A_{i,j,k}\}$ may indicate an action by which a corresponding DRX parameter set $D_{i,j,k}$ thereof are selected from the candidate DRX parameter sets $\{D_{i,j,k}\}$, and the DRX parameters $T_{DS,dt}$, $T_{DL,dt}$ and $N_{SC,dt}$ may be set as the selected $D_{i,j,k}$. That is, if the action set $A_{i,j,k}$ is taken, the i-th candidate $T_{DS,i}$ may be set as the cycle length $T_{DS,dt}$ of the short DRX cycles, the k-th candidate $T_{DL,k}$ may be set as the cycle length $T_{DL,dt}$ of the long DRX cycles and the j-th candidate $N_{SC,j}$ may be set as the maximum number of the short DRX cycles $N_{SC,dt}$ at the decision point $d_t$.

Next, at step 83, a set of discrete traffic states $\{s_m\}$ may be provided. Each entity $s_m$ of the set of discrete traffic states $\{s_m\}$ may indicate a traffic status between the base station and the UE, wherein such a traffic status may have a Poisson traffic rate $\lambda_{Sm}$. Real traffic status between the base station and the UE at the decision point $d_t$, which may be denoted as $S_{dt}$, may be one entity $s_m$ of the set of discrete traffic states $\{s_m\}$.

Next, at step 84, an objective function $\Psi(B_{dt}, A_{i,j,k})$ may be calculated. The objective function $\Psi(B_{dt}, A_{i,j,k})$ may be associated with each entity $A_{i,j,k}$ of the group of candidate action sets $\{A_{i,j,k}\}$ and associated with the set of discrete traffic states $\{S_m\}$. The objective function $\Psi(B_{dt}, A_{i,j,k})$ may be further associated with a set of estimated traffic states $B_{dt}$ (e.g., the belief state). Specifically, when performing TDCA scheme, the traffic status between the base station and the UE at the decision point $d_t$ may be considered. However, the real traffic status $S_{dt}$ at the decision point $d_t$ may be un-available (e.g., invisible) to the base station. That is, the base station may not know the real traffic status $S_{dt}$ directs to which entity of the discrete traffic states $\{S_m\}$. Therefore, the estimated traffic states $B_{dt}$, which may take place of the real traffic state $S_{dt}$, may be employed to provide information of the traffic status at the decision point $d_t$ for the base station. Based on the set of estimated traffic states $B_{dt}$, the base station may perform the TDCA scheme.

Except the information of the traffic status at the decision point $d_t$ which may be provided by the estimated traffic states $B_{dt}$, a reward $r(s_m, A_{i,j,k})$ associated with each entity of the candidate action sets $\{A_{i,j,k}\}$ may be needed for the base station to perform the TDCA scheme. Based on the estimated traffic states $B_{dt}$ and the reward $r(s_m, A_{i,j,k})$, the objective function $\Psi(B_{dt}, A_{i,j,k})$ may be calculated, and the base station may perform the TDCA scheme at steps 85 and 86 based on the calculated objective function $\Psi(B_{dt}, A_{i,j,k})$. The detailed description of the method for calculating the objective function $\Psi(B_{dt}, A_{i,j,k})$ will be provided in the following paragraphs by reference to FIGS. 8B to 8F.

At step 85, the base station may select an appropriate action set $A_{i,j,k}$ from the candidate action sets $\{A_{i,j,k}\}$ based on the objective function $\Psi(B_{dt}, A_{i,j,k})$. That is, the action set which has the maximum value of the objective function $\Psi(B_{dt}, A_{i,j,k})$ (e.g., according to equation (30)) may be selected as the appropriate action set.

Next, at step 86, an appropriate action $A_{dt}$ which corresponds to the action set $A_{i,j,k}$ selected at step 85, may be taken at the decision point $d_t$. A DRX parameter set $D_{i,j,k}$ corresponding to the selected action set $A_{i,j,k}$ may be chosen to set the DRX parameters $T_{DS,dt}$, $T_{DL,dt}$ and $N_{SC,dt}$ and the TDCA scheme may thus be performed.

Figure 8B:
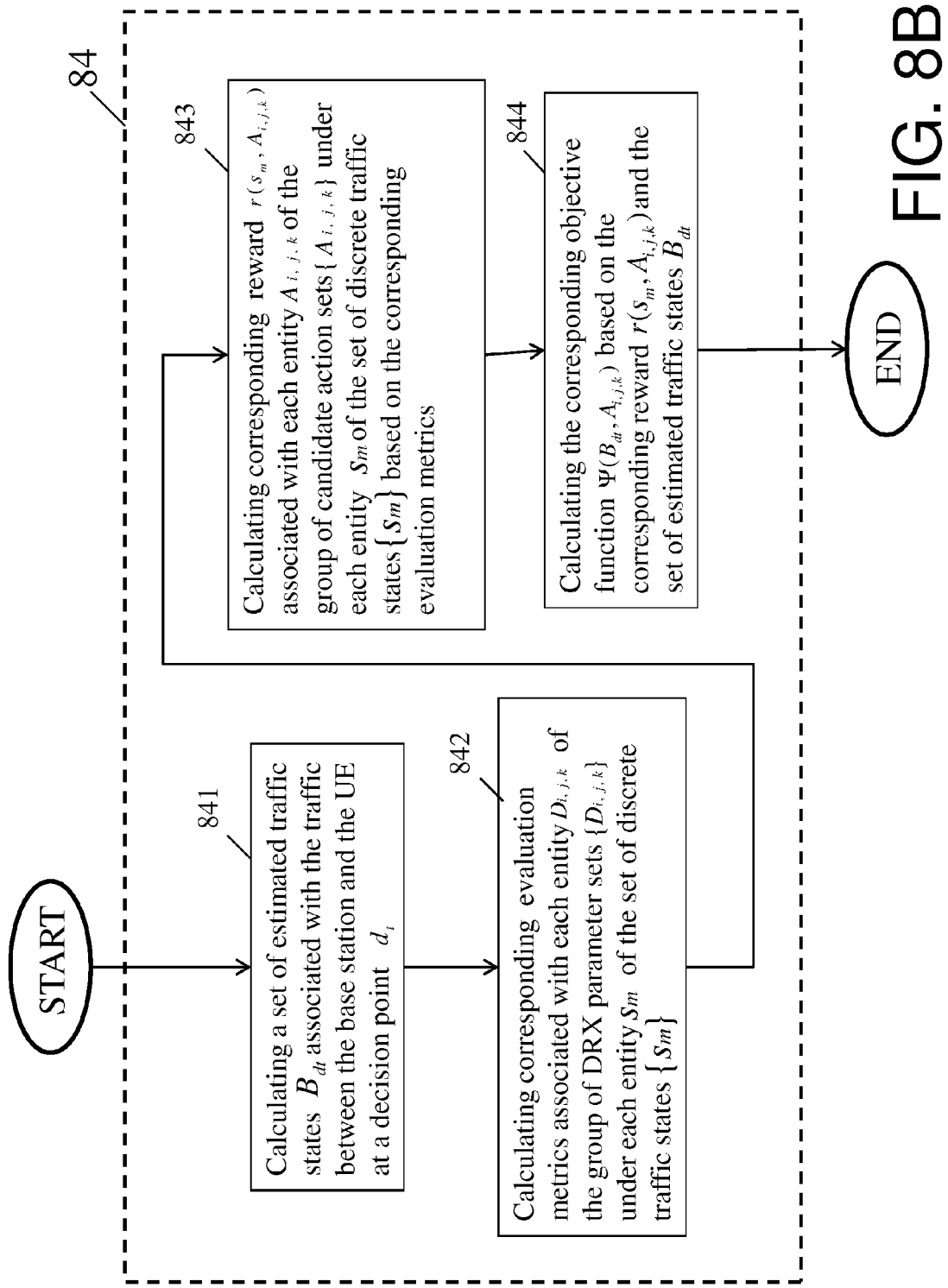
FIG. 8B is a flow diagram of a method for calculating corresponding objective function at step 84 illustrated in FIG. 8A.

FIG. 8B is a flow diagram of a method for calculating corresponding objective function at step 84 illustrated in FIG. 8A. Referring to FIG. 8B, first, at step 841, the set of estimated traffic states $B_{dt}$ associated with the traffic between the base station and the UE at the decision point $d_t$ may be calculated. Next, at step 842, evaluation metrics associated with each DRX parameter set $D_{i,j,k}$ under each discrete traffic state $S_m$ may be calculated. Next, at step 843, based on the evaluation metrics calculated at step 842, the reward $r(s_m, A_{i,j,k})$ may be obtained. The reward $r(s_m, A_{i,j,k})$ and the set of estimated traffic states $B_{dt}$ calculated at step 841 may then be provided for calculating the objective function $\Psi(B_{dt}, A_{i,j,k})$ at step 844.

Figure 8C:
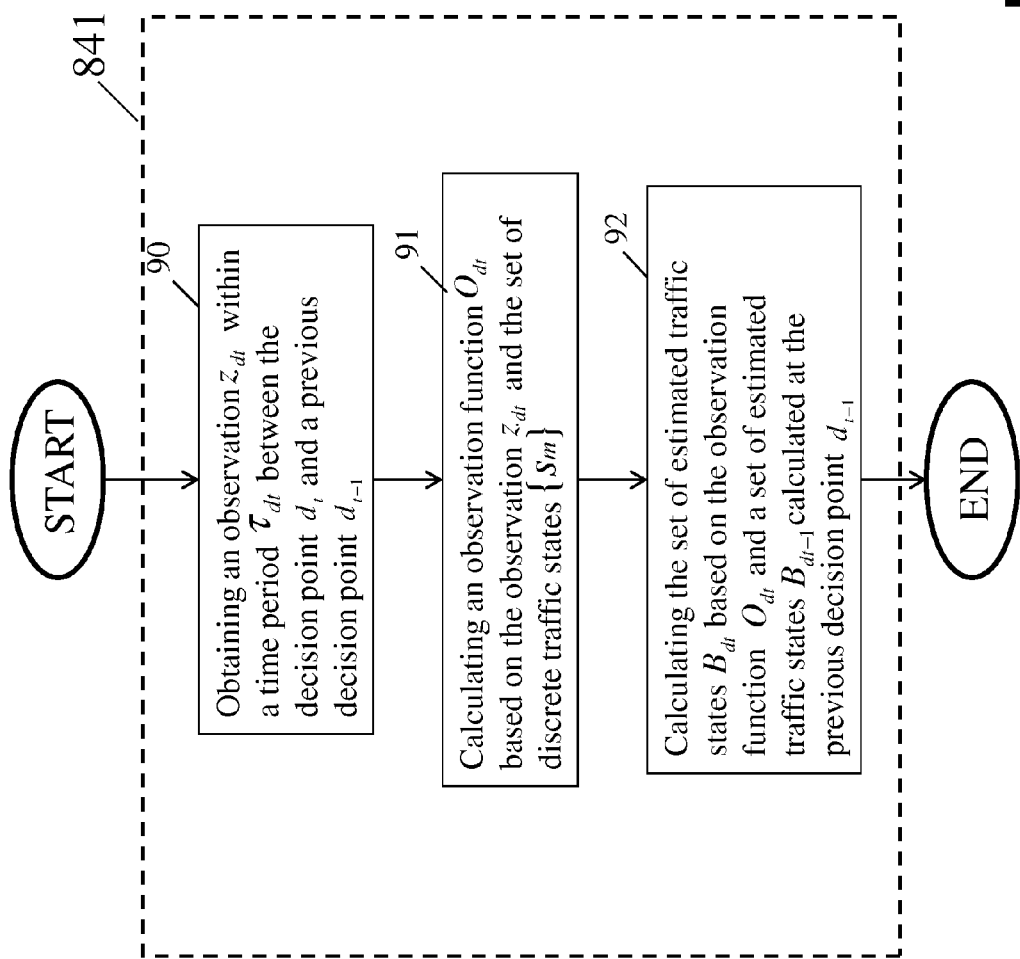
FIG. 8C is a flow diagram of a method for calculating a set of estimated traffic states at step 841 illustrated in FIG. 8B.

FIG. 8C is a flow diagram of a method for calculating a set of estimated traffic states $B_{dt}$ at step 841 illustrated in FIG. 8B. Referring to FIG. 8C, first, at step 90, an observation $z_{dt}$ that may indicate traffic information observed within a period $\tau_{dt}$ between the previous decision point $d_{t-1}$ and the present decision point $d_t$, may be obtained. Such traffic information may include the number of packets which may arrive within the period $\tau_{dt}$ and may be denoted as $n_{dt}$.

Next, at step 91, an observation function $O_{dt}$ may be calculated based on the observation $z_{dt}$ and the set of discrete traffic states $\{s_m\}$ utilizing equations (23) and (24).

Next, at step 92, the estimated traffic states (e.g., the belief states $B_{dt}$) may be calculated based on the observation function $O_{dt}$ calculated at step 91 and another set of estimated traffic states $B_{dt-1}$ calculated at the previous decision point $d_{t-1}$. The calculated estimated traffic states $B_{dt}$ may be registered and provided for calculating the set of estimated traffic states $B_{dt+1}$ at the next decision point $d_{t+1}$.

Figure 8D:
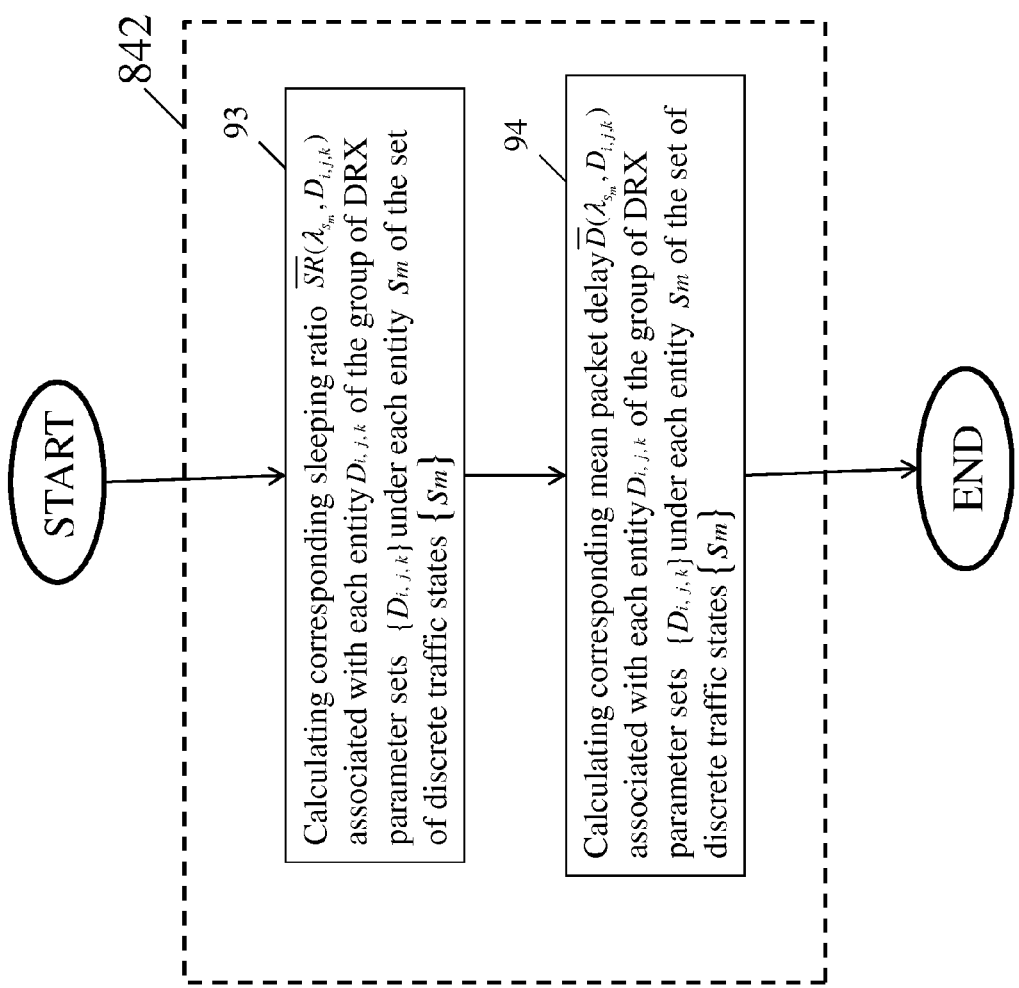
FIG. 8D is a flow diagram of a method for calculating corresponding evaluation metrics at step 842 illustrated in FIG. 8B.

FIG. 8D is a flow diagram of a method for calculating corresponding evaluation metrics at step 842 illustrated in FIG. 8B. Referring to FIG. 8D, first, at step 93, a first evaluation metric (e.g., the sleeping ratio $\overline{SR}(\lambda_{s_m}, D_{i,j,k})$) may be calculated utilizing equation (18). Next, at step 94, a second evaluation metric (e.g., the mean packet delay $\overline{D}(\lambda_{s_m}, D_{i,j,k})$) may be calculated utilizing equation (21). The sleeping ratio $\overline{SR}(\lambda_{s_m}, D_{i,j,k})$ and the mean packet delay $\overline{D}(\lambda_{s_m}, D_{i,j,k})$ may be calculated for each associated discrete traffic state $s_m$ and each associated DRX parameter set $D_{i,j,k}$.

Figure 8E:
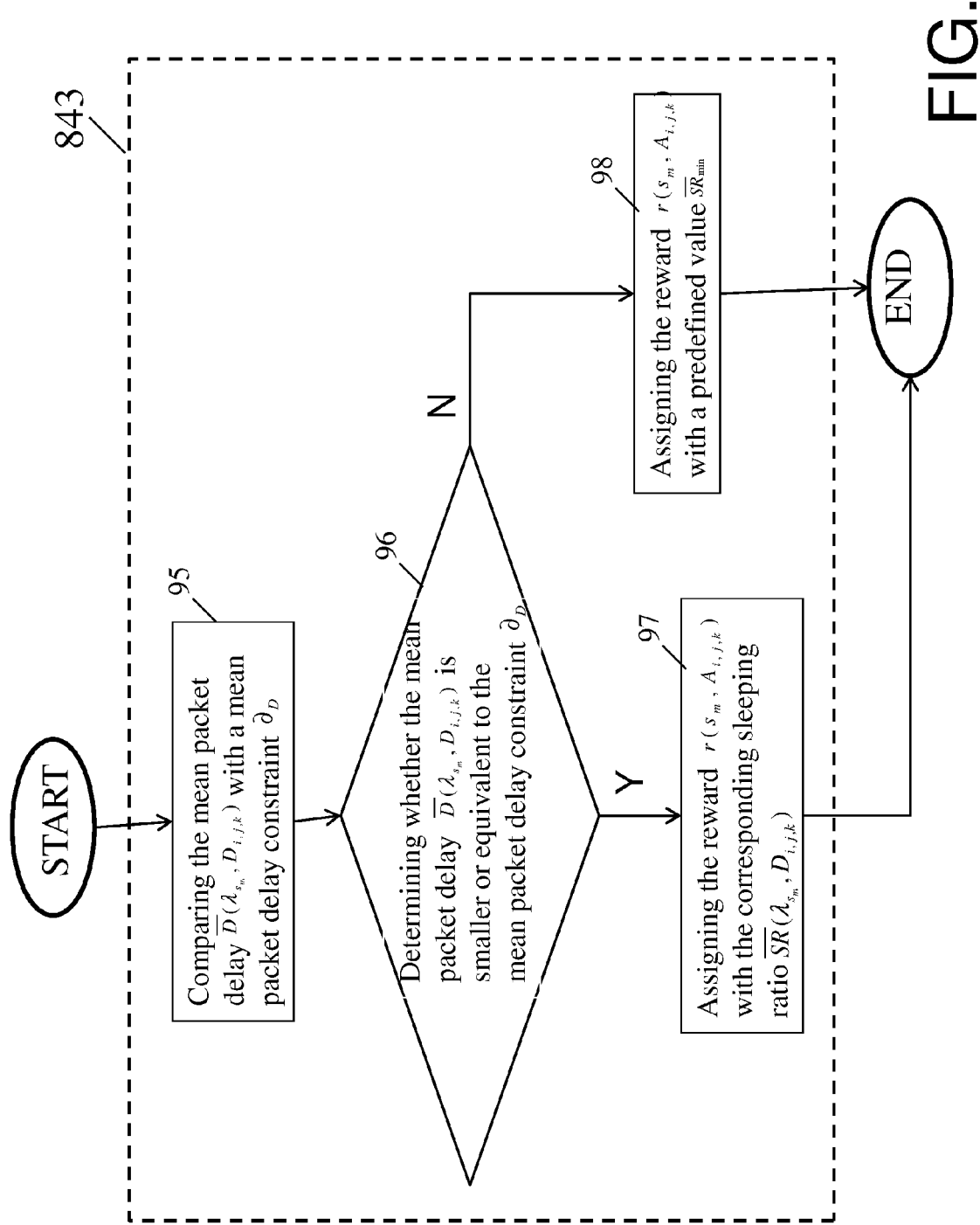
FIG. 8E is a flow diagram of a method for calculating corresponding reward at step 843 illustrated in FIG. 8B.

FIG. 8E is a flow diagram of a method for calculating corresponding reward at step 843 illustrated in FIG. 8B. Referring to FIG. 8E, first, at step 95, the mean packet delay $\overline{D}(\lambda_{s_m}, D_{i,j,k})$ may be compared with a predefined constraint (e.g., the mean packet delay constraint $\partial_D$). Next, at step 96, the comparing result generated at step 95 may be analyzed. If the mean packet delay $\overline{D}(\lambda_{s_m}, D_{i,j,k})$ is smaller than or equivalent to the mean packet delay constraint $\partial_D$, at step 97 the reward $r(s_m, A_{i,j,k})$ may be assigned with the corresponding sleeping ratio $\overline{SR}(\lambda_{s_m}, D_{i,j,k})$. Otherwise, at step 98, the reward $r(s_m, A_{i,j,k})$ may be assigned with a predefined value denoted as $\overline{SR}_{min}$. In one example, the predefined value $\overline{SR}_{min}$ may include zero.

Figure 8F:
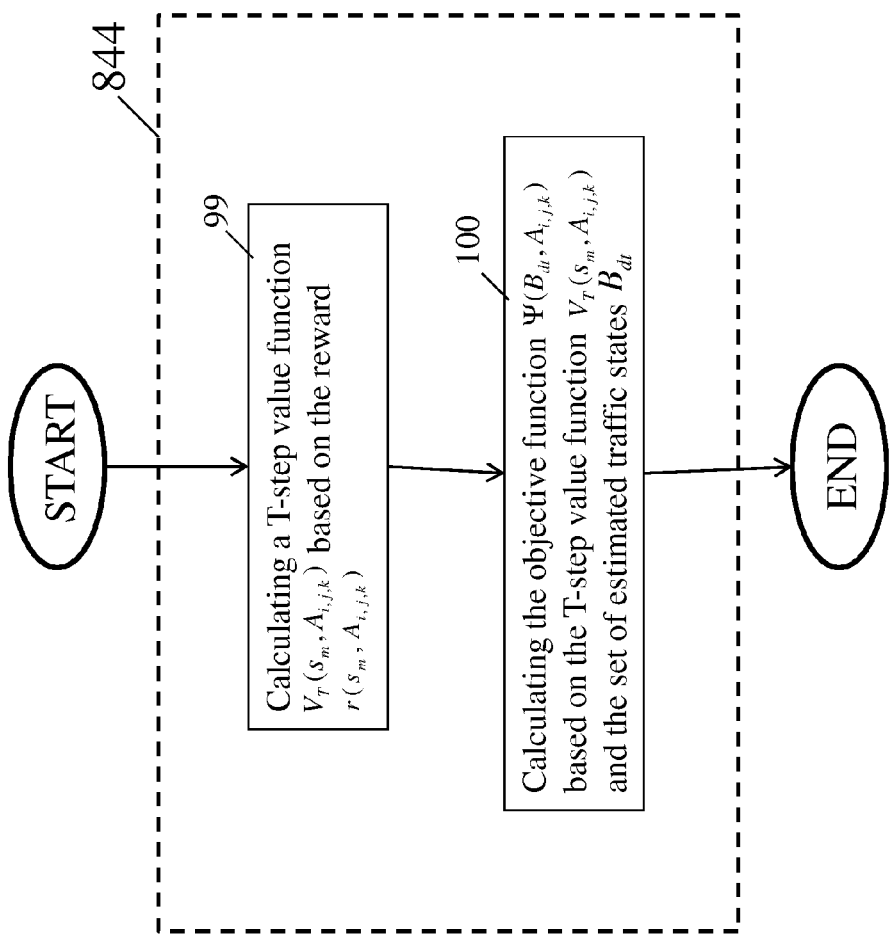
FIG. 8F is a flow diagram of a method for calculating the corresponding objective function at step 844 illustrated in FIG. 8B.

FIG. 8F is a flow diagram of a method for calculating the corresponding objective function at step 844 illustrated in FIG. 8B. Referring to FIG. 8F, at step 99, the T-step value function $V_T(s_m, A_{i,j,k})$ may be calculated based on the reward $r(s_m, A_{i,j,k})$. That is, the T-step value function $V_T(s_m, A_{i,j,k})$ may be transferred from the reward $r(s_m, A_{i,j,k})$. In one example, to reduce the computing complexity, the T-step value function $V_T(s_m, A_{i,j,k})$ may be reduced to a one-step value function $V_1(s_m, A_{i,j,k})$, and the reward $r(s_m, A_{i,j,k})$ may be directly assigned with the one-step value function $V_1(s_m, A_{i,j,k})$.

Next, at step 100, based on the T-step value function $V_T(s_m, A_{i,j,k})$ and the belief state $B_{dt}$, the objective function $\Psi(B_{dt}, A_{i,j,k})$ may be obtained utilizing equation (29). That is, the objective function $\Psi(B_{td}, A_{i,j,k})$ may be calculated by averaging the T-step value function $V_T(s_m, A_{i,j,k})$ over all entities of the traffic states $\{s_m\}$ with the belief states $B_{dt}$ as the weightings.

It will be appreciated by those skilled in the art that changes could be made to the examples described above without departing from the broad inventive concept thereof. It is understood, therefore, that the various embodiments are not limited to the particular examples disclosed, but it is intended to cover modifications within the spirit and scope of the various embodiments and as defined by the appended claims.

Further, in describing representative examples of the various embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the various embodiments should not be limited to the performance of their steps in the order written, and one skilled in the art can readily appreciate that the sequences may be varied and still remain within the spirit and scope of the various embodiments.

We claim:

1. A device, comprising:
   a storage device configured to store a set of parameters associated with a user equipment (UE) of a mobile communication system, a set of traffic states associated with data traffic between a base station device and the UE, and transition probability data associated with the set of traffic states; and
   a processor, communicatively coupled to the storage device, that executes or facilitates execution of executable instructions to at least:
   determine a set of estimated traffic states associated with the data traffic,
   select an entity associated with the set of parameters,
   determine an evaluation metric associated with the entity for a traffic state from the set of traffic states,
   determine a reward associated with the entity for the traffic state based on the evaluation metric,
   determine an objective function associated with the traffic state based on the reward and the set of estimated traffic states, and
   facilitate power management for the UE as a function of the entity associated with the set of parameters.

2. The device of claim 1, wherein the processor further executes or facilitates the execution of the executable instructions to select the entity at a decision point.

3. The device of claim 2, wherein the processor further executes or facilitates the execution of the executable instructions to perform a discontinuous reception (DRX) operation to achieve the power management, wherein the is associated with DRX cycles of the DRX operation.

4. The device of claim 3, wherein the entity comprises a parameter set comprising at least one of a first, a second and a third parameter relative to the DRX cycles.

5. The device of claim 4, wherein the DRX cycles comprise short DRX cycles and long DRX cycles longer than the short DRX cycles, and wherein the decision point is associated with a beginning time point of the short DRX cycles.

6. The device of claim 5, wherein the first parameter comprises a cycle length of the short DRX cycles, the second parameter comprises an upper limit of a number of the short DRX cycles, and the third parameter comprises a cycle length of the long DRX cycles.

7. The device of claim 1, wherein the transition probability data indicates probability of the traffic state being transitioned into another traffic state from the set of traffic states.

8. The device of claim 1, wherein the processor further executes or facilitates the execution of the executable instructions to determine the set of estimated traffic states based on the set of traffic states and an observation associated with the data traffic between the base station device and the UE.

9. The device of claim 1, wherein the set of estimated traffic states are determined according to a partially observable Markov decision process (POMDP) model.

10. The device of claim 1, wherein the set of estimated traffic states comprise a set of belief states.

11. The device of claim 1, wherein the evaluation metric comprises a sleeping ratio for the UE associated with the DRX operation and a mean packet delay associated with the data traffic between the base station device and the UE.

12. The device of claim 1, wherein the mobile communication system is a third generation partnership project (3GPP) long term evolution (LTE) communication system.

13. A method, comprising:
determining an objective function associated with an entity of a candidate action set associated with a set of parameters, including calculating a set of estimated traffic states associated with traffic between a base station device and a user equipment (UE) of a mobile communication system at a decision point,
calculating an evaluation metric associated with the entity for a traffic state from a set of traffic states associated with the traffic,
calculating a reward associated with the entity for the traffic state based on the evaluation metric, and
calculating the objective function based on the reward and the set of estimated traffic states;
selecting an action from the candidate action set based on the objective function and a transition probability matrix associated with the set of traffic states; and
performing the action at the decision point, wherein the performing the action facilitates the power management for the UE.

14. The method of claim 13, wherein the entity is associated with discontinuous reception (DRX) cycles of a DRX operation, and wherein the DRX operation is performed by the base station device.

15. The method of claim 14, wherein the entity comprises a parameter set comprising at least one of a first, a second and a third parameter relative to the DRX cycles.

16. The method of claim 15, wherein the DRX cycles comprise short DRX cycles and long DRX cycles, and wherein the decision point is associated with a beginning time point of the short DRX cycles.

17. The method of claim 16, wherein the first parameter comprises a cycle length of the short DRX cycles, the second parameter comprises an upper limit of a number of the short DRX cycles, and the third parameter comprises a cycle length of the long DRX cycles.

18. The method of claim 13, wherein the calculating the set of estimated traffic states comprises:
obtaining an observation that is associated with the traffic and a time period between the decision point and a previous decision point;
calculating an observation function based on the observation and the set of traffic states; and
calculating the set of estimated traffic states based on the observation function and a second set of estimated traffic states that are calculated at the previous decision point.

19. The method of claim 18, wherein the calculating the evaluation metric comprises:
calculating a sleeping ratio for the traffic state that is associated with the entity; and
calculating a mean packet delay for the traffic state that is associated with the entity.

20. The method of claim 18, wherein the calculating the set of estimated traffic states includes calculating the set of estimated traffic states according to a partially observable Markov decision process (POMDP) model.

21. The method of claim 20, wherein the set of estimated traffic states comprises a set of belief states.

22. The method of claim 19, wherein the calculating the reward comprises:
comparing the mean packet delay with a predefined constraint;
determining whether the mean packet delay is smaller or equivalent to the predefined constraint;
assigning the reward with the sleeping ratio in response to the mean packet delay being smaller or equivalent to the predefined constraint; and
assigning the reward with a predefined value in response to the mean packet delay being larger than the predefined constraint.

23. The method of claim 22, wherein the determining the objective function comprises:
calculating a T-step value function based on the reward, wherein the T-step value function is associated with the traffic state; and
calculating the objective function based on the T-step value function and the set of estimated traffic states.

24. The method of claim 22, wherein the predefined value comprises zero.

25. The method of claim 23, wherein the calculating the objective function based on the T-step value function comprises:
normalizing the set of traffic states based on the set of estimated traffic states to generate a set of weighted traffic states;
calculating an average of the T-step value function for the set of weighted traffic states; and
assigning the objective function with the average of the T-step value function.

26. The method of claim 13, wherein the mobile communication system is a third generation partnership project (3GPP) long term evolution (LTE) communication system.

* * * * *